(12) United States Patent
Chari et al.

(10) Patent No.: US 8,064,404 B2
(45) Date of Patent: *Nov. 22, 2011

(54) METHOD OF SUBNET ROAMING WITHIN A NETWORK

(75) Inventors: Amalavoyal Chari, Sunnyvale, CA (US); Devabhaktuni Srikrishna, Sunnyvale, CA (US); John Zhuge, San Jose, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/634,970

(22) Filed: Dec. 10, 2009

(65) Prior Publication Data

US 2010/0085920 A1 Apr. 8, 2010

Related U.S. Application Data

(63) Continuation of application No. 10/996,868, filed on Nov. 24, 2004, now Pat. No. 7,649,866, which is a continuation-in-part of application No. 10/602,179, filed on Jun. 24, 2003, now Pat. No. 7,016,328.

(51) Int. Cl.
*H04Q 7/00* (2006.01)

(52) U.S. Cl. ............... 370/331; 370/395.54; 370/389

(58) Field of Classification Search ............ 370/338, 370/475, 230, 313, 328, 329, 331, 401, 474, 370/310, 310.1, 310.2, 312, 351, 352, 332, 370/336, 345, 442, 355, 356, 326, 238, 469, 370/395.54, 389; 709/245, 242, 238, 229, 709/226, 230; 340/825.52; 455/435, 436, 455/433, 437, 439, 442, 445, 238, 229, 226, 455/230

See application file for complete search history.

(56) References Cited

U.S. PATENT DOCUMENTS

| | | | |
|---|---|---|---|
| 6,298,053 B1 | 10/2001 | Flammer, III et al. | |
| 6,427,170 B1 | 7/2002 | Sitaraman et al. | |
| 6,434,134 B1 * | 8/2002 | La Porta et al. | 370/338 |
| 6,490,259 B1 * | 12/2002 | Agrawal et al. | 370/331 |
| 6,542,510 B1 * | 4/2003 | Fujimori et al. | 370/402 |
| 6,657,981 B1 * | 12/2003 | Lee et al. | 370/331 |
| 6,988,146 B1 | 1/2006 | Magret et al. | |
| 7,016,682 B2 | 3/2006 | Won et al. | |
| 7,035,281 B1 * | 4/2006 | Spearman et al. | 370/465 |
| 7,080,151 B1 * | 7/2006 | Borella et al. | 709/230 |
| 7,096,273 B1 * | 8/2006 | Meier | 709/236 |
| 7,184,421 B1 * | 2/2007 | Liu et al. | 370/338 |
| 7,277,434 B2 * | 10/2007 | Astarabadi et al. | 370/389 |
| 7,356,009 B1 * | 4/2008 | Meier et al. | 370/338 |
| 7,489,659 B2 * | 2/2009 | Siorpaes et al. | 370/331 |
| 7,519,367 B2 | 4/2009 | Igarashi et al. | |
| 7,586,879 B2 | 9/2009 | Chari et al. | |
| 7,649,866 B2 * | 1/2010 | Chari et al. | 370/331 |
| 2002/0085517 A1 | 7/2002 | Lee et al. | |
| 2002/0161905 A1 * | 10/2002 | Haverinen et al. | 709/229 |
| 2003/0217145 A1 | 11/2003 | Leung et al. | |
| 2003/0220111 A1 | 11/2003 | Kang | |
| 2003/0224788 A1 * | 12/2003 | Leung et al. | 455/435.1 |
| 2004/0203740 A1 | 10/2004 | Won et al. | |

* cited by examiner

*Primary Examiner* — Chuong T Ho

(74) *Attorney, Agent, or Firm* — Brian R. Short

(57) ABSTRACT

Disclosed is an apparatus and method of client device roaming from a home subnet to a foreign subnet of a network. The method includes the client device accessing the network through a first access node of the home subnet, and the client device roaming to a second access node of the foreign subnet, the client device accessing the network through the second access node, the client device maintaining a fixed client IP address, default gateway IP address and IP subnet attachment as the client device roams from the first access node to the second access node.

15 Claims, 13 Drawing Sheets

METHOD OF SUBNET ROAMING WITHIN A NETWORK

RELATED PATENT APPLICATIONS

This patent application is a continuation of patent application Ser. No. 10/996,868 now U.S. Pat. No. 7,649,866 filed Nov. 24, 2004, which is a continuation-in-part of patent application Ser. No. 10/602,179 filed on Jun. 24, 2003, and issued as U.S. Pat. No. 7,016,328 on Mar. 21, 2006.

FIELD OF THE INVENTION

The invention relates generally to wireless communications. More particularly, the invention relates to a method of subnet roaming within a network.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device being connected to a network through a base station that is wired to the network. The wireless device can transmit data packets that are received by the base station and then routed through the network. The wireless network can include many base stations that are each wired to the network.

A wireless device may be mobile, and therefore, require access to more than one base station. When the wireless device travels from an access range of a first base station to an access range of a second base station, a handoff must occur as the connection between the wireless device and the first base station stops, and a new connection between the wireless device and the second base station begins.

An advanced mobile phone system (AMPS) employs a centrally coordinated approach to accomplish handoffs as a mobile phone roams from on cell (defined by a base station) to another cell. When a connection to a mobile phone is to be made, a mobile telephone switching office (MTSO) attempts to locate the mobile phone by instructing all cell sites to page the mobile phone. If the MTSO is connected to a large number of cell sites, and there are a large number of mobile phones, the number of pages is substantial. Handoffs are requested by the mobile device (phone). This approach requires a centralized control which makes it non-scalable. Additionally, this approach requires intelligence within the mobile device so that the device can signal the MTSO when a handoff is necessary. Additionally, routing can be inefficient.

Another approach to wireless accessing is Mobile IP. Mobile IP requires the existence and participation of the following network entities: a Home Agent (HA), a Foreign Agent (FA) and a Mobile Node (MN). In addition, there is a Correspondent Host (CH) that seeks to exchange traffic with the Mobile Node (MN). The Home Agent is charged with keeping track of the physical location of the MN at any point in time and establishing and maintaining a tunnel to an FA near the MN. Any data traffic arriving at the HA for the MN, is routed through the tunnel to the FA. The FA is required to register new MN's and inform the corresponding HA, set up and maintain a tunnel for each MN to its HA and forward data traffic between the MN and its HA through the tunnel. The MN is responsible for Agent Discovery (detecting the local FA) and Registration (registering with the local FA). This approach has several limitations.

The two network entities (HA and FA) are required to be equipped with Mobile IP software for operation of the protocol. Mobile IP MN software has to be loaded on the client device. The HA may be physically far away from the FA. Therefore, considerable latencies may be incurred in routing the data traffic over the tunnel. In particular, this means that applications with low latency requirements such as voice or video will not be well served by this approach. This also approach suffers from a "triangle routing problem". That is, if the Home Agent is not on the direct path between the Correspondent Host (CH) and the FA, then data traffic between the CH and the MN will travel a circuitous path, resulting in increased latencies and traffic inefficiencies. Packets received for the MN before the MN has registered at the new FA are discarded by the HA. In the case of TCP sessions, these lost packets may trigger a Slow Start/Congestion Avoidance phase that leads to dramatically reduced end-to-end throughput. While the route switches between forwarding and the final route, some out-of-order packets may be generated, affecting the performance of TCP-based applications as well as multimedia traffic that rely on mostly-in-order packet delivery and reasonably consistent end-to-end performance. While this approach may be expected to work sufficiently well for macro-mobility scenarios, the overhead of routing traffic through a tunnel may be overkill for a situation where a mobile device is roaming quickly within a small geographic area (micro-mobility). These two application scenarios are sometimes also described as nomadicity and mobility.

A wireless mesh network includes wireless access nodes interconnected by a mesh of wireless links. Generally, mesh networks suffer from the same handoffs limitations as the mobile phone system. More specifically, handoffs require specific hardware and software within the mobile device to support handoffs within the wireless network.

It is desirable to have a wireless mesh network that allows wireless handoffs of a client between access nodes of different subnets of the mesh network, and does not require the client to include special hardware or software. The mesh network should support nomadicity as well as mobility. It is desirable that the network be able to track clients as the clients roam through the network. Additionally, the network should be fault tolerant.

SUMMARY OF THE INVENTION

An embodiment of the invention includes a method of client device roaming from a home subnet to a foreign subnet of a network. The method includes the client device accessing the network through a first access node of the home subnet, and the client device roaming to a second access node of the foreign subnet, the client device accessing the network through the second access node, the client device maintaining a fixed client IP address, default gateway IP address and IP subnet attachment as the client device roams from the first access node to the second access node.

Another embodiment includes a method of operating a gateway. The method includes allowing a client device to maintain a fixed client IP address, default gateway IP address and IP subnet attachment as the client device roams from a different access node of a home subnet, to an access node within a cluster of the gateway, and providing the client device with access to a network through a foreign subnet associated with the gateway.

Other aspects and advantages of the present invention will become apparent from the following detailed description,

DETAILED DESCRIPTION

Figure 1:
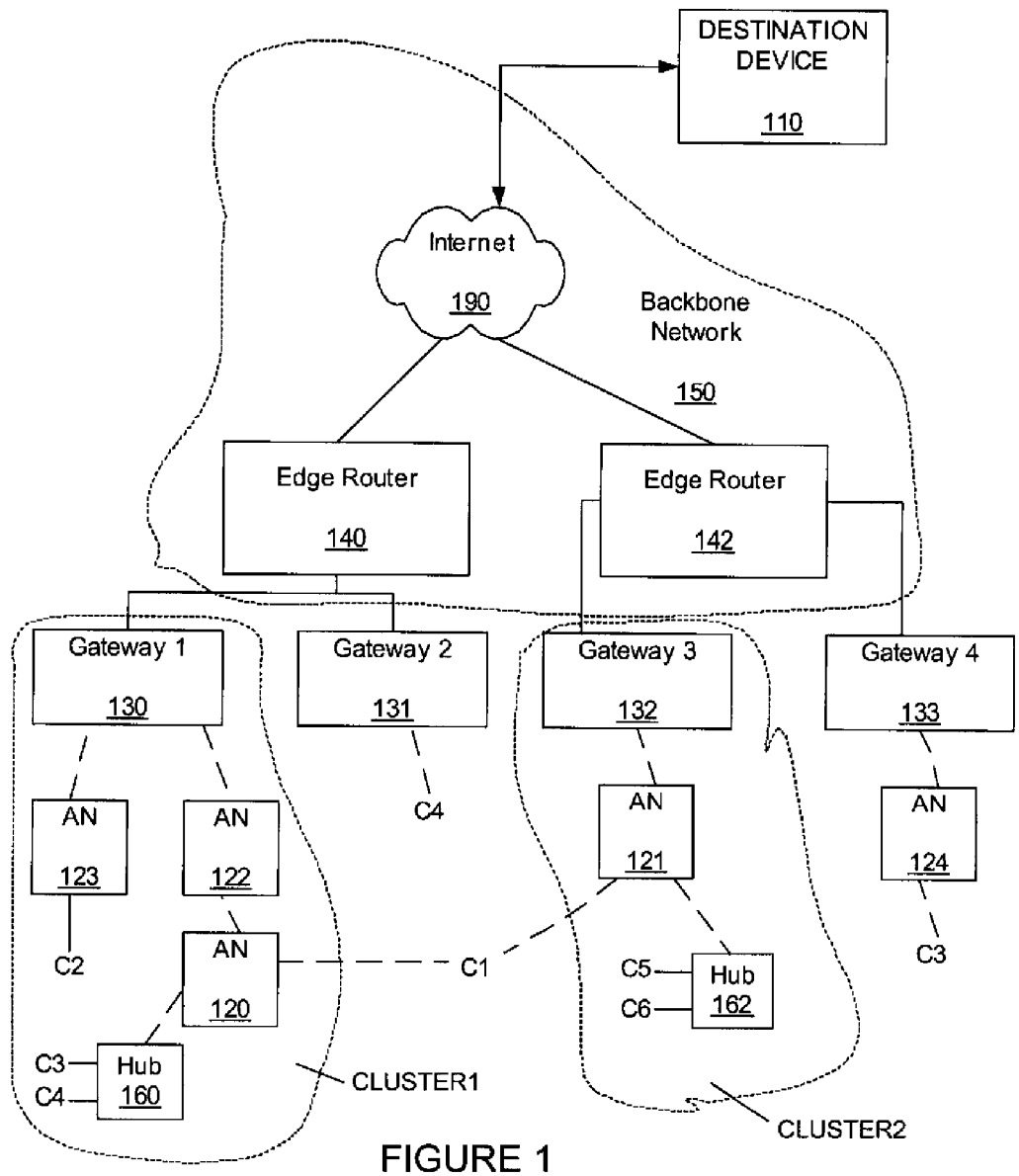
FIG. 1 shows a wireless mesh network that can include embodiments of the invention.

As shown in the drawings for purposes of illustration, the invention is embodied in an apparatus and method for wireless roaming between subnets within a wireless mesh network.

FIG. 1 shows a wireless mesh network that can include embodiments of the invention. Generally, the invention includes allowing a client C1 to communicate with a destination device 110, as the client C1 roams from wireless access with a first access node 120 to wireless access with a second access node 121. The wireless access nodes 120, 121 generally belong to a wireless mesh network.

The wireless mesh network as shown in FIG. 1 includes a first gateway 130, a second gateway 131, a third gateway 132 and a fourth gateway 133. Generally, the gateways 130, 131, 132, 133 are connected through wires to a first edge router 140 and a second edge router 142 of a backbone network 150. The edge routers 140, 141 provide wired connections to an internet network 190. The destination device 110 is connected to the internet 190, thereby providing a communications path between the gateways 130, 131, 132, 133 and the destination device 110. Generally, the edge routers define separate subnets. That is, the first edge router 140 generally defines a first subnet, and the second edge router 142 defines a second subnet.

As described, subnets are generally defined by edge routers. Subnets can be categorized into home and foreign subnets. Home subnets include home clusters that include home gateways. A home gateway is a gateway that is connected to an edge router that has a direct subnet route to the subnet to which the client device's IP address belongs. A foreign gateway is a gateway that is connected to an edge router that does not have a direct subnet route to the subnet to which the client device's IP address belongs. Foreign subnets include foreign clusters that include foreign gateways. Foreign gateways are associated with subnets other than the home subnet, but can connect a client to the network. As shown in FIG. 1, clusters (such as CLUSTER1 associated with the gateway 130 and connected to the edge router 140), are associated with a first subnet, and clusters (such as CLUSTER2) associated with the gateways 132, 133, and connected to edge router 142 are associated with a different subnet.

As previously described, the gateways 130, 131, 132, 133 belong to a wireless mesh network. The wireless mesh network can additionally include many wireless access nodes, including the previously mentioned first and second access nodes 120, 121. The wireless mesh network can additionally include a third access node 122, a fourth access node 123 and a fifth access node 124.

As shown in FIG. 1, the third and fourth access nodes 122, 123 are wirelessly connected to the first gateway 130. The single wireless link between the first gateway 130 and the third and fourth access nodes 122, 123 can be designated as a single hop. The first access node 120 is wirelessly connected to the third access node 122. The double wireless link between the first gateway 130 and the first access node 120 can be designated as a double hop.

The connections or links between access nodes, and between access nodes and other devices can be either wired or wireless. For example, FIG. 1 shows a hub 160 connected to the first access node through a wire. A second hub 162 is shown to be wirelessly connected to the second access node 121.

The access nodes and devices of a gateway can define a cluster. For example, a first cluster (CLUSTER1) of FIG. 1 includes first gateway 130, the first, third and fourth access nodes 120, 122, 123 and the hub 160. A second client C2 can be connected to the first cluster through the fourth access node 123, third and fourth clients C3, C4 can be connected to the first cluster through the first hub 160.

A second cluster (CLUSTER2) can include the third gateway 132, the second access node 121, and the second hub 162. A fifth client C5 and a sixth client C6 can be connected to the second cluster through the second hub 162.

A third cluster can include the second gateway 131 that is wirelessly connected to a fourth client C4.

A fourth cluster can include the fourth gateway 133 that is wirelessly connected to a fifth access node 124. The fifth access node 124 can be wirelessly connected to a third client C3.

As previously described, a client can be allowed (the first client C1 as shown in FIG. 1) to roam between access nodes. The access nodes can be from a common cluster, from different clusters, and as will be described later, from different clusters having different subnets.

A client generally can include a laptop computer, a personal digital assistant (PDA), a cell-phone, or any other device that includes as interface card adaptable for use with the mesh network of the invention. The client can access the network though wired or wireless connections. Wireless clients can access the network through a MAC (media access control), PHY (physical layer) protocol such as IEEE 802.11. The 802.11 protocol includes authentication and association protocols between client devices and the network. The client device can include a NIC (network interface card). The wireless clients can include a wireless to wired CPE (consumer premises equipment) bridge designed to accept a wireless backhaul connection while providing wire Ethernet connectivity inside a home. The wireless to wired CPE can connect one or more Ethernet-equipped client device (such as laptops or personal computers) to the wireless access network. Such a configuration can be referred to as "clients behind a CPE". The client device can be directly connected (for example, by Ethernet) to an Ethernet port on a wireless mesh access node. For example, the client device could be an IP video camera attached to an Ethernet port of street-light mounted mesh access node. This type of client device can be referred to as a "wired client".

An access node generally includes any point of attachment of a client with the mesh network. The access node can be a wireless access point, a wired access point, a router, a hub, a gateway, or any other networking device capable of attachment to a client.

A downlink interface is a network interface (logical or physical) that attaches an access node to a client device. An access node can have more that one downlink interface. Tunnel interfaces (described later) generally implement IP encapsulation, and are treated as uplink or downlink interfaces, depending on the context. A tunnel interface on a foreign gateway is treated as an uplink interface whereas a tunnel interface on a home gateway is a downlink interface. All other interfaces other than downlink interfaces are termed uplink interfaces.

A gateway is a network entity that maintains an address mapping table for each client. As will be described, the address mapping table generally includes a MAC-IP address mapping for the client devices. A single gateway corresponds with each access node. However, each gateway can service several access nodes. A gateway may also serve as an access node, providing a point of attachment to client devices.

A cluster is defined as a set of access nodes that are serviced by a single gateway.

A gateway can be an access node. In this case, the gateway generally includes one or more downlink interfaces. An embodiment includes the gateway being an edge router between wired and wireless networks. This embodiment generally includes the gateway being at a cluster boundary. Here, the cluster is defined as the maximal set of access nodes and client devices serviced by the gateway.

An access network is defined by a collection of networked clusters.

A backbone network is generally defined as all network elements that are not a part of the access network.

An edge router is generally a network element that is directly connected to a gateway through a wired or wireless connection. The edge router is not a member of a cluster. The edge router implements routing logic to aid in the forwarding and routing of packets. Generally, the edge routers define separate subnets of the network.

The internet is a global network connecting millions of computers, in which control of the network is decentralized. Generally, each internet computer is independent, and referred to as a host.

A subnet is a portion of a network that shares a common address component. On TCP/IP networks, subnets are defined as all devices whose IP addresses have the same prefix. For example, all devices with IP addresses that start with 100.100.100 are part of the subnet 100.100.100.0 with subnet mask 255.255.255.0. Dividing a network into subnets is useful for both security and performance reasons.

An exemplary embodiment of the gateways includes the gateways 130-133 broadcasting routing packets (beacons), which can be used to determine routing between access nodes 120-124 and gateways 130-133 of the network. The beacons are received by all first-level access nodes (for example, access nodes 121-124), which are access nodes that are able to receive gateway transmitted beacons, and directly route data through to a gateway.

The beacons are used to establish a route from each access node to a gateway. The first level access nodes re-broadcast the beacon data, attaching their own information to the beacon. The information indicates to the second level access nodes that the path to the gateway includes the first level access node.

For one embodiment, the link quality of the beacon received determines whether that beacon is rebroadcast by the system. If the quality of the beacon is above a determined threshold, it is rebroadcast. The beacons can be used to determine the quality of the link in both an upstream (towards a gateway) direction, and in a downstream (away from a gateway) direction. The upstream and the downstream link qualities can be used by each access node to select the best data routing path to a gateway.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node. FIG. 1 also includes a second level access node 120.

Figure 2:
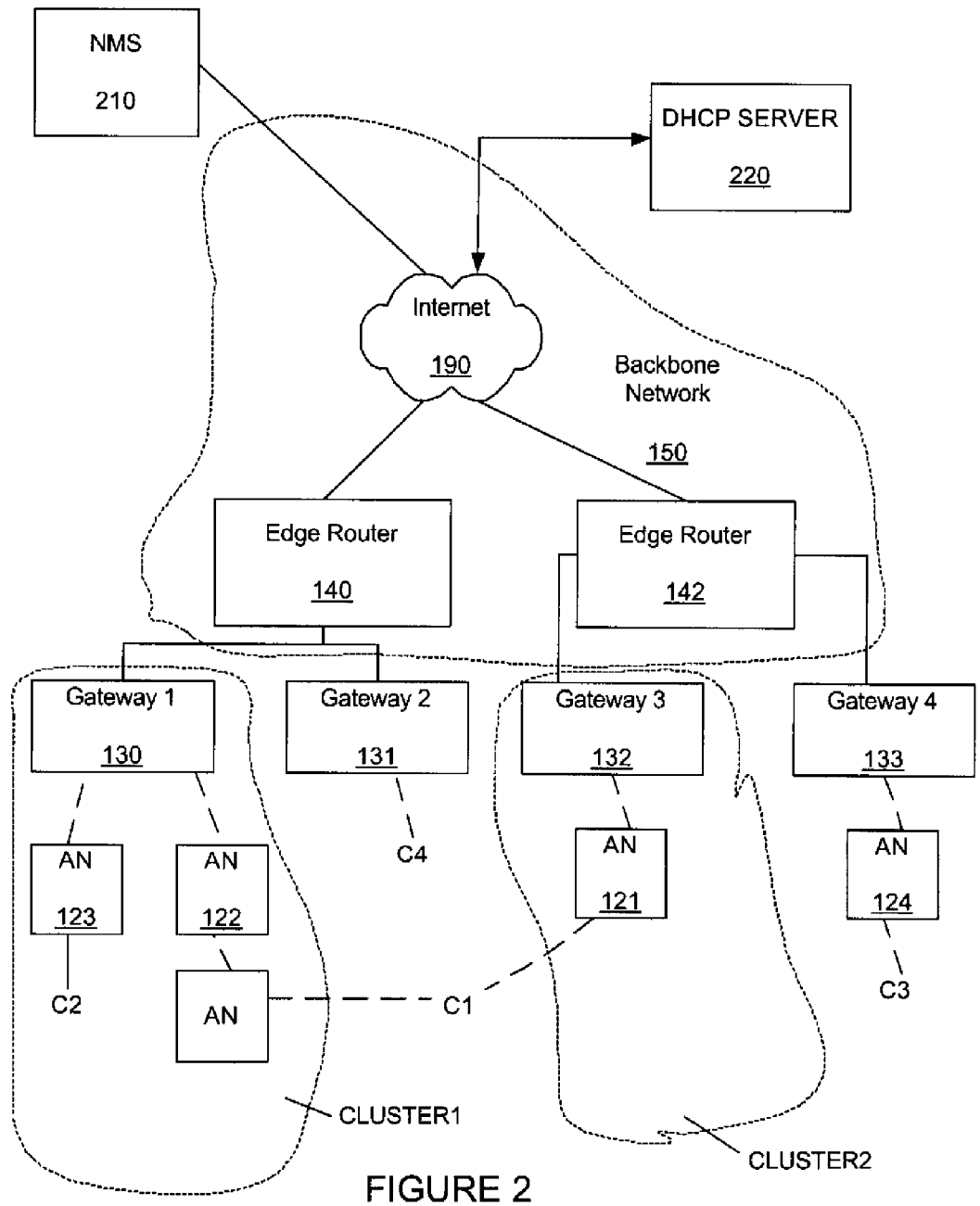
FIG. 2 shows another wireless mesh network that can include embodiments of the invention.

In the system of FIG. 1, a reverse beacon can be used to permit the gateway to receive data to set up a full (two-way) routing path. A reverse beacon can be initiated when an access node wishes to initiate communication with an upstream gateway. A reverse beacon is generated by an access node and may be unicast or broadcast. Reverse beacons are used to notify an upstream node of downstream nodes (and clients attached to those downstream nodes) that have selected it as part of their path back to a gateway. In this way, reverse beacons allow an upstream node to establish routes to downstream nodes and clients FIG. 2 shows another wireless mesh network that can include embodiments of the invention. FIG. 2 includes the addition of a network management system (NMS) 210 and a DHCP server 220.

The NMS 210 provides management of a wireless mesh network. The NMS 210 can provide network management, address management, monitoring, performance tracking, configuration management and security functions.

The DHCP server 220 dynamically provides IP address assignments to client devices through, for example, the dynamic host configuration protocol. The dynamic host configuration protocol is a protocol for assigning dynamic IP addresses to devices on a network. With dynamic addressing, a device can have a different IP address every time it connects with the network. In some systems, the device's IP address can even change while it is still connected. DHCP also supports a mix of static and dynamic IP addresses.

Figure 3:
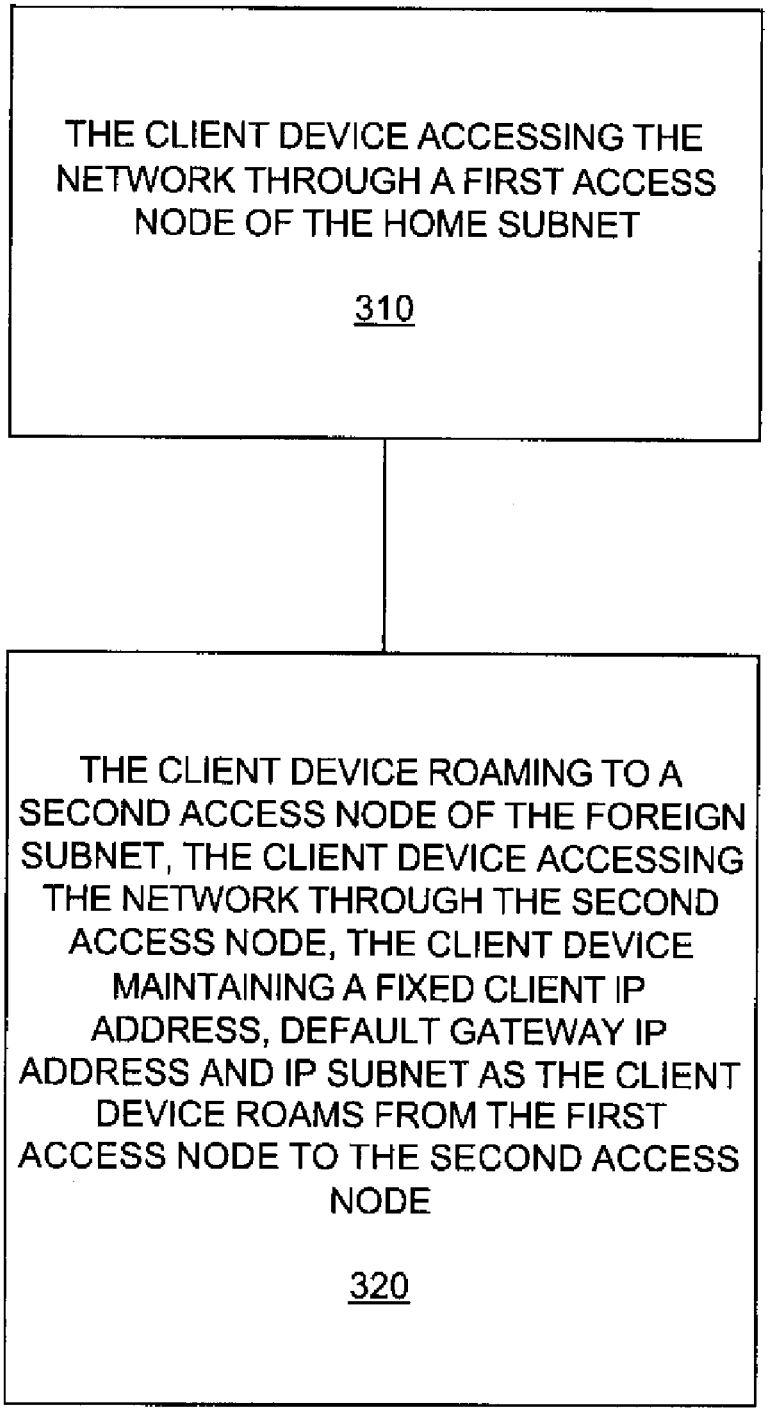
FIG. 3 is a flow chart of a method of client roaming from a home subnet to a foreign subnet.

FIG. 3 is a flow chart that includes a method of client device roaming from a home subnet to a foreign subnet of a network. A first step 310 of the method includes the client device accessing the network through a first access node of the home subnet. A second step 320 includes the client device roaming to a second access node of the foreign subnet, the client device accessing the network through the second access node, the client device maintaining a fixed client IP address, default gateway IP address and IP subnet attachment as the client device roams from the first access node to the second access node. Additionally, the client device can maintain a MAC address of a default gateway as the client device roams from first access node to the second access node.

The home subnet includes a home gateway and a home cluster. The home subnet is the subnet of the cluster to which the client device attaches when it first obtains an IP address. When the client device roams to a cluster in a different subnet, its IP address should not have to change, as otherwise TCP and UDP sessions in progress will have to be interrupted. The invention allows the IP address of the client device to be maintained as it roams to a different cluster in a different subnet. As the client device roams from the first access node of the home subnet to the second access node of the foreign subnet, the client device performs an authentication and association with a foreign gateway of the foreign subnet. The authentication and association may be according to an 802.11 protocol. During the authentication and association, a MAC address of the client device is obtained at the access node of attachment. The MAC address can be used to resolve the client IP address of the client device. One way to resolve the IP address is through the foreign gateway of the foreign subnet sending a request to designated gateways of all other subnets of the network. The home gateway can respond with the IP address corresponding to the client device's MAC address. This allows host routes to be set up for the client device at the access nodes of the foreign subnet, and at the home gateway and foreign gateway.

Detection of a Client

Generally, detecting the client includes detecting a MAC address of the client, and determining an IP address of the client. When a client device is attached to an access network, the MAC address of the client device can be detected. Several different methods can be used to detect the MAC address.

Some Medium Access Control (MAC) protocols include receiving an association request from the client. An embodiment of the invention includes an 802.11b protocol that creates an association between a client device and the corresponding access node. At any given point of time, a client device can only be associated to a single access node. The list of client devices attached to an access node can usually be obtained by querying a network interface card driver within the access node. This method only applies to MAC protocols, such as 802.11b, that create associations between client devices and access nodes and would, for instance, not apply in the case of an Ethernet MAC.

Frames originating from the client device can be inspected. The frames can include the client device's MAC address as the source MAC address. Inspection of these frames at the access node allows the access node to determine the client device's MAC address. Inspection of each incoming frame at the access node incurs considerable network processing overhead even if there are no new client devices attaching to the downlink interface. Therefore, this method can be inefficient. This method can be made more efficient by only inspecting frames with source MAC addresses not matching a list of known source MAC addresses corresponding to attached client devices that have already been detected. This method of detection can fail if the client device does not generate any traffic.

The access nodes can ping a broadcast address. More specifically, the access node can periodically ping the broadcast address (255.255.255.255) and inspect the ping responses to determine the MAC and IP addresses of any client devices attached to the downlink interface. TCP/IP stacks of some operating systems do not respond to broadcast pings, and this method may not be reliable.

An attached client device can generate ARP requests for hosts on its subnet. These ARP requests can result in the generation of ARP cache entries for the client device on the access node to which the client device is attached. Through an examination of the ARP cache, the access node can determine the MAC addresses (and corresponding IP addresses) of attached client devices. This method has the disadvantage that ARP cache entries on the access nodes are generated only in response to ARP requests from the client device and these are issued only when the client device's ARP cache expires. On many client device operating systems, the ARP cache expiration time can be as long as 20 minutes.

Once the MAC address of the client has been determined, generally the IP address of the client must be determined. Several different methods can be used to detect the client IP address.

Detection of the client IP address can include the foreign gateway of the foreign subnet sending a request to designated gateways of all other subnets of the network. An exemplary request includes an AARP request. The home gateway of the home subnet of the client device responds to the request with the client IP address of the client device. The request-response protocol can follow the AARP protocol as described. The home gateway of the home subnet of the client device can additionally respond to the request with the default gateway IP address and IP subnet attachment. The home gateway can additionally respond to the request with other networking parameters associated with the client device, including, but not limited to, its DHCP lease expiration time, its encryption keys, etc. The home gateway can additionally respond with the subnet to which the client devices IP address belongs (that is, the home subnet and its network mask).

Figure 4:
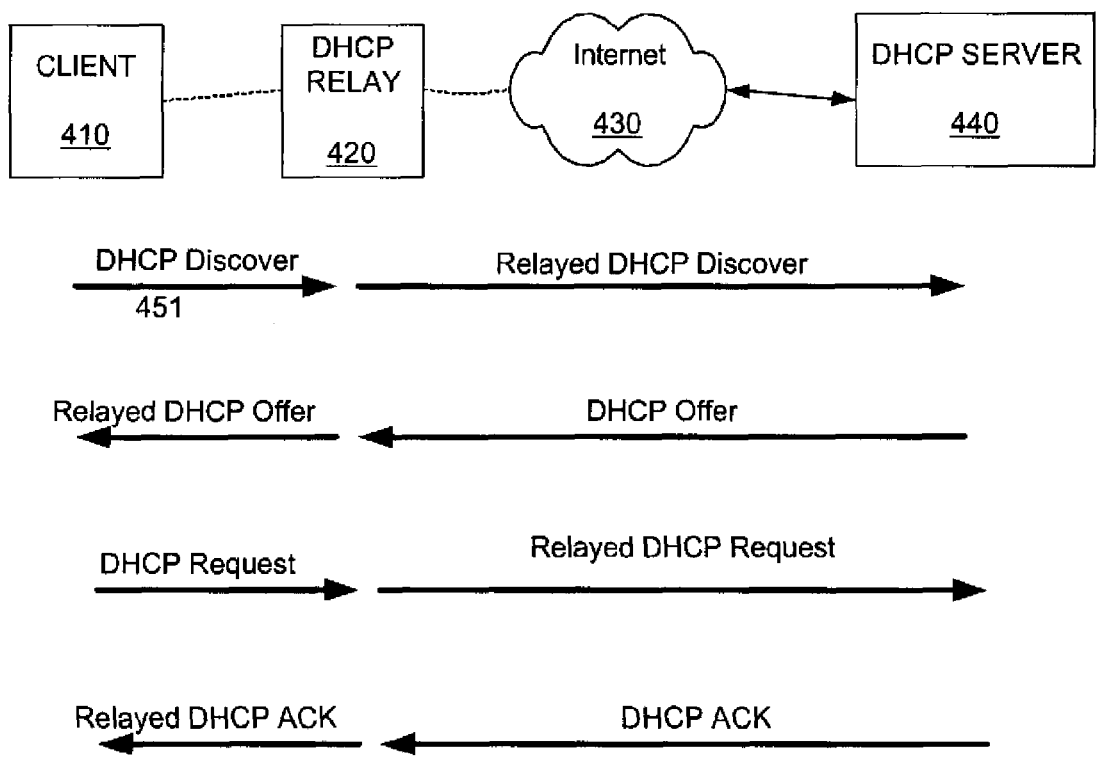
FIG. 4 shows a sequence of events executed during a DHCP transaction according to an embodiment of the invention.

FIG. 4 shows a sequence of events during a DHCP transaction. Default gateway determination in FIG. 4 includes interactions between a client device 410, a DHCP relay (typically, an access node) 420, a network 430 and a DHCP server 440.

The client 410 initiates a DHCP discover 451. The DHCP relay 420 relays the DHCP discover through the network 430 to the DHCP server 440. The DHCP server 440 generates a DHCP offer that includes an IP address (IP1) and a default gateway (DG1). The DHCP relays the DHCP offer to the client 410. Upon receiving the DHCP offer, the client 410 generates a DHCP request. Again, the DHCP relay 420 relays the DHCP request to the DHCP server 440. The DHCP server 440 generates an acknowledgement. The client device 410 receives the acknowledgement. The DHCP relay 420 records the IP address and default gateway for this transaction.

An access node can inspect DHCP packets when a client device performs a DHCP exchange. The DHCP exchange can be either DHCP renewal or DHCP discovery. The access node (running a DHCP server or relay) can inspect the DHCP acknowledgement packets (the fourth leg of the DHCP 4-way handshake) and determine the IP address assigned to the client device's MAC address. This procedure only works when the Client Device originates a DHCP discover or a DHCP request. This can be an infrequent but periodic occurrence during continued operation, but is generally expected behavior for the client device on boot-up. This mechanism is useful in detecting new client devices that have just booted up and are joining the network for the first time.

One or more servers (gateways) on the network can maintain a MAC-address-to-IP-address mapping for all client devices attached to the network. The address mapping can be stored in an address mapping table that can be arranged to be synchronized across all the servers. This address mapping table can be referred to as an AARP Table (AARP=Anti- ARP). ARP is generally is a protocol for the resolution of IP addresses to MAC addresses. Here, anti-ARP (AARP) is a protocol for the resolution of MAC addresses to IP addresses An access node can query one of these servers (gateways) to determine the IP address corresponding to the MAC address of one of the Client Devices attached (in communication) to the access node. Generally, the gateway (server) responds with the IP address of the client device (if this entry exists in its AARP Table). If the entry does not exist in the AARP table, the gateway queries other gateways. The gateway generally then responds to the access node with the reply received.

Generally, the access node functions as an AARP Client. A Gateway acts as an AARP Server when responding to AARP Requests from an Access Node or a Gateway and as an AARP Client when sending AARP Requests to another Gateway. The service requested is the determination of the IP address corresponding to a given MAC address. Therefore, the service request is termed AARP (Anti-ARP), as opposed to ARP which is a protocol for the resolution of IP addresses to MAC addresses.

Figure 5:
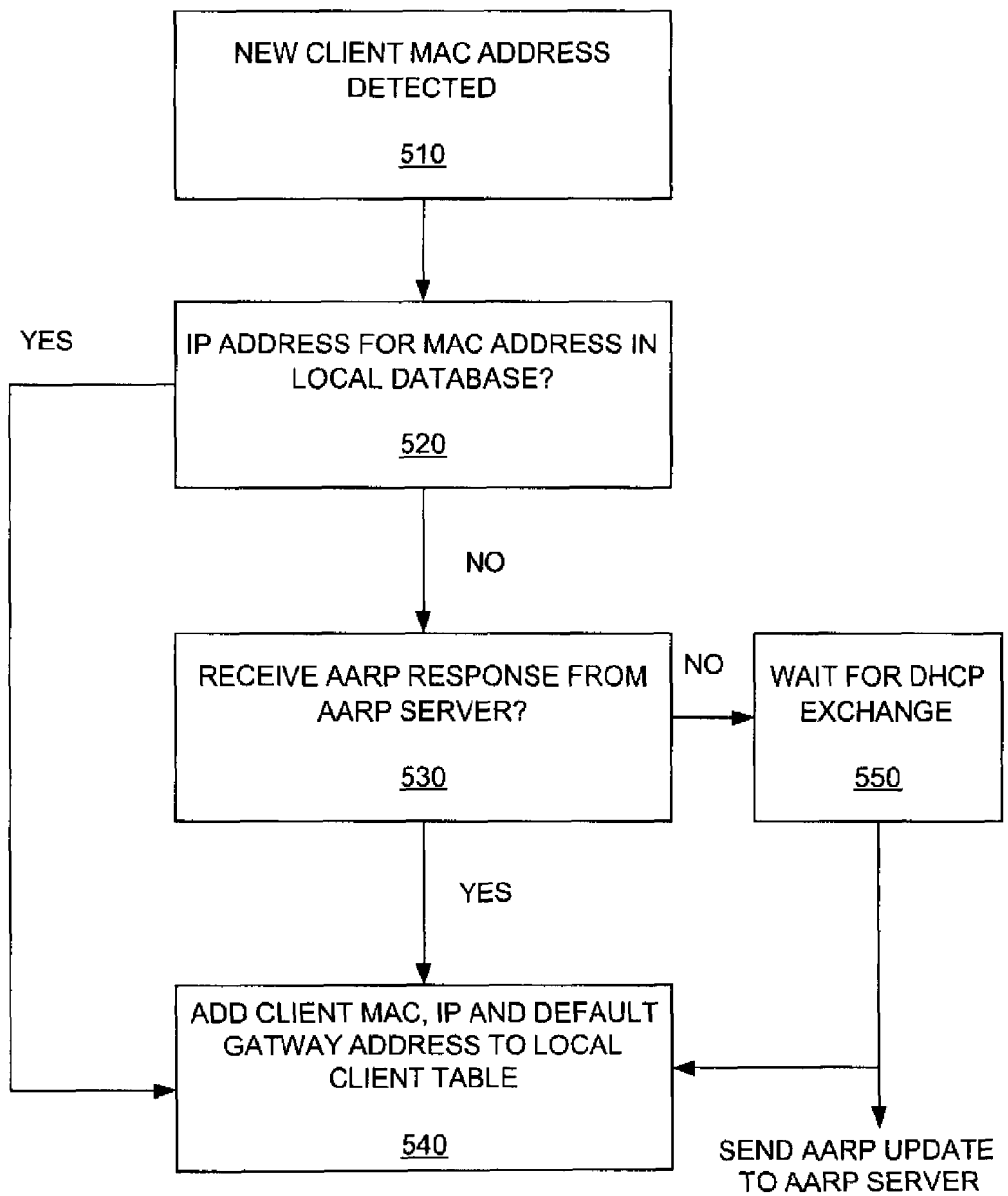
FIG. 5 shows a sequence of events for resolving a client's IP address at an access node according to an embodiment of the invention.

FIG. 5 shows a sequence of events for resolving a client's IP address at an access node according to an embodiment of the invention.

A first event 510 includes a new client MAC address being detected.

A second event 520 includes inquiring whether an IP address for the new client MAC address is within a local database. If the IP address is within the local database, then a local client table can be updated with the client MAC address, the client IP address and the client default gateway (DG). If the IP address is not within the local database, then an AARP server can be queried.

A third event 530 includes receiving an AARP response from the AARP server. If a response is received, then the local database, then a fourth event 540 includes a local client table being updated with the client MAC address, the client IP address and the client default gateway (DG). If a response is not received, then a fifth event 550 includes waiting for a DHCP exchange from the new client. The client IP address and the client default gateway (DG) are obtained from the DHCP acknowledgement. When an exchange is received, the local client table can be updated with the client MAC address, the client IP address and the client default gateway (DG), and an AARP update is sent to the AARP server.

Figure 6:
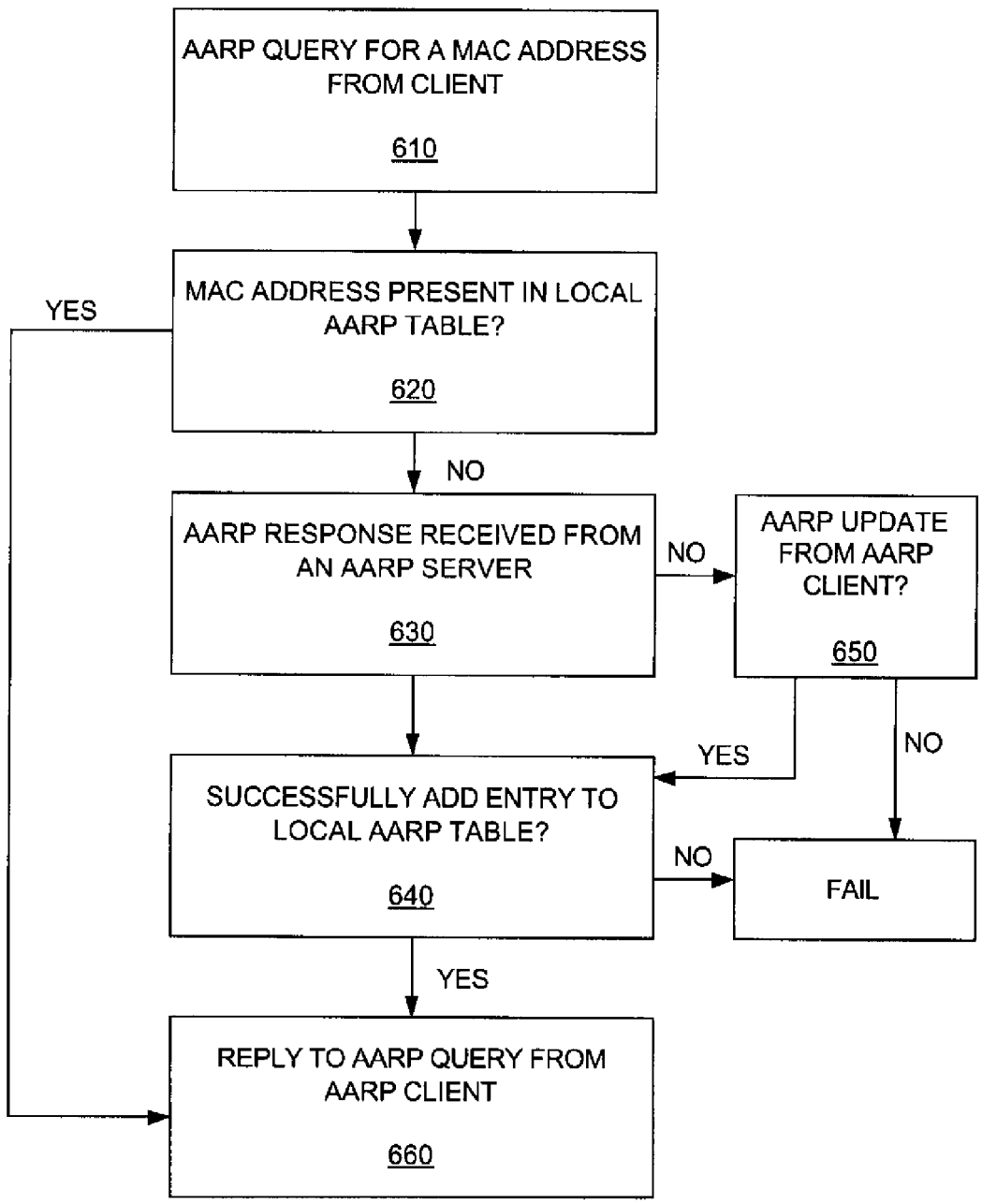
FIG. 6 shows a sequence of events for a MAC address query at a gateway according to an embodiment of the invention.

FIG. 6 shows a sequence of events for a MAC address query at a gateway according to an embodiment of the invention.

A first event 610 includes receiving an AARP query for a MAC address from an AARP client.

A second event 620 includes determining whether a MAC address is present in a local AARP table. If the MAC address is within the local AARP table, then a reply to the AARP query is sent to the AARP client. If the MAC address is not within the local AARP table, then an AARP query is generated for other AARP servers.

A third event 630 includes receiving an AARP response from an AARP server. If the response is received, then a fourth event 640 includes adding the MAC address as an entry to a local AARP table. If the response is not received, then a fifth event 650 includes waiting for an AARP update from the client. If the AARP update is received the fourth step 640 is executed, and the MAC address is added as an entry to a local AARP table.

Another embodiment of the invention includes an access node pinging a broadcast address to determine IP addresses of client devices detected by the access node. The broadcast address can be pinged after the MAC address of the client device has been determined. The operating system of the client device must respond to broadcast pings.

The access node can inspect IP datagrams originating from a MAC address belonging to a client device in order to ascertain the device's IP address. This method generally requires the client device to generate traffic. This method can be rendered more efficient by only inspecting datagrams whose source MAC address does not correspond to an IP address of a client device that is known to be attached to the access node. The access node can determine the IP address of an attached client device through an examination of its own ARP cache.

Client Network Parameters

In addition to the MAC and IP addresses of an attached client device, there are a few other parameters of operation that are relevant to the networking of a client device. These other parameters generally smooth uninterrupted operation of applications of the client device while roaming within an access network.

MAC Address of Client Device's Default Gateway (DG)

Some applications on a client device that use the client device's default gateway's MAC address as the seed in the generation of an encryption key will reset themselves if the MAC address of the client device's default gateway appears to change. This reset implies an application failure that presents itself as an interruption of service to the end-user. Therefore, the network needs to present the client device with the appearance that the MAC address of the client device's default gateway does not change, regardless of the client device's position within the network, or roaming of the client device.

IP Address of Client Device's Default Gateway

Analogous to the situation described above, generally, the network must provide a single (and unchanged) default gateway IP address to the client device.

Length of DHCP Lease

The length of a DHCP lease allows the network to track the presence and status of the client device.

An embodiment includes the client device issuing a DHCP renew request if an IP address lease of the client is due to expire. The second access node (newly roamed to access node of a foreign subnet) can intercept the DHCP renew request, and identify the home subnet of the client device from a locally stored AARP entry from the client device. The second access node can relay the home subnet to the home gateway of the home subnet. The home gateway can receive a delayed DHCP request, and the home gateway can relay the DHCP request to a local DHCP server. The home gateway can relay a DHCP response to an access node the client device is attached, renewing the client device IP address. If the client device IP address lease expires prior to being renewed, then client device issues a DHCP discover broadcast. An access node attached to the client device relays the DHCP discover broadcast to a local DHCP server. The local DHCP server assigns the client an IP address from a locally available pool of addresses. The client device networking parameters are updated, thereby making the foreign subnet the home subnet of the client device.

Time when the Client Device was Last Seen on the Network

Knowledge of the time when the client device was last seen on the network allows the network to track the presence and status of the client device.

For an embodiment, detecting the client includes determining client network parameters by at least one of determining a MAC address of client's default gateway, determining an IP address of client's default gateway, determining a length of a DHCP lease, determining a time the client was last on the network.

Accessing Client Network Parameters

Several different methods can be used for maintaining information pertaining to a client. A first gateway within a same cluster as the first wireless access node can maintain information pertaining to the client. A gateway not within a same cluster as the first wireless access node can maintain information pertaining to the client. At least two gateways can maintain information pertaining to the client. A previously described network management system connected to a same cluster as the first wireless access node can maintain client parameter information The previously described, AARP is a protocol for resolving MAC addresses to IP addresses. The AARP is based on a client-server architecture. The AARP client sends an AARP request to the AARP server requesting the IP address and other relevant parameters corresponding to a given client device MAC address. The AARP server replies with an AARP response that contains the requested information.

Generally, the network architecture includes a distributed network of AARP servers that may query each other and synchronize their address mapping tables periodically or on-demand in order to satisfy AARP queries.

In addition, an AARP client may send an AARP update to an AARP server to allow it to create new entries in the AARP mapping table. A similar asynchronous AARP update may be originated by an AARP server and sent to other AARP servers to trigger an update to their address mapping tables.

Access nodes will typically function as AARP clients and gateways typically function as AARP clients or servers, depending on the context.

Messaging between AARP clients and servers or between AARP servers can take place over UDP, TCP or other messaging protocols with an optional per-packet encryption using a symmetric key algorithm such as AES or 3DES or an asymmetric key algorithm such as RSA. Communication is also possible through IP-in-IP tunnels or other alternative means of communication. If an unreliable protocol such as UDP is used for messaging, the AARP application must implement reliability mechanisms such as retries.

Several different methods can be used for obtaining client information. An embodiment includes an access node referencing at least one of a first gateway within the same cluster as the access node, or another gateway, to obtain client information regarding the client. The access node can obtain the client information from at least one of the gateways by sending an anti-ARP request. If a first requested gateway does not have the client information, then the first requested gateway can request the client information from another gateway. The requests of the first gateway can be transmitted over a back haul interface of the first gateway.

An embodiment includes the anti-ARP request being continuously re-transmitted until a response is received. An embodiment includes the anti-ARP request being retransmitted upto a preset maximum number of times until a response is received.

Several different methods can be implemented in which a gateway can send request for client information from other gateways. A first embodiment includes the requests of the gateway being unicast as IP datagrams. Another embodiment includes the requests of the gateway can be multicast to other gateways. Another embodiment includes the requests of the first gateway can be broadcast to other gateways.

For an embodiment, if none of the gateways have information regarding the client, then information regarding the client is obtained by an access node querying a network interface card driver of the access node that is detecting the client. For another embodiment, if none of the gateways have information regarding the client, then an IP address of the client is obtained by at least one of pinging the broadcast address, snooping IP datagrams originating from MAC address of client, inspecting a DHCP acknowledgment packet. For another embodiment, if none of the gateways have information regarding the client, then a default gateway IP address of the client is obtained by inspection of a DHCP acknowledgment packet. The information of the gateways can be updated with the obtained client information.

Generation of AARP Table Entries on Gateways

AARP entries corresponding to client devices can be generated at the gateways according to one of several different methods.

A first method includes the gateway receiving an AARP query from an access node for the IP address corresponding to the MAC address of an attached client device. The gateway then queries the other gateways and receives an AARP Response from one (or more) of them with the corresponding IP address. The gateway then records the MAC and IP address (and other relevant parameters) into the address mapping table.

The gateway receives an AARP Update message from other gateways on the access network containing the relevant parameters for one or more client devices.

When a client device attaches to the access network for the first time, the client can request an IP address using DHCP. The access node to which the client device is attached can inspect the DHCP exchange and determine the IP address which the client device has accepted. The client device then sends an AARP update to its gateway informing it of the MAC-IP mapping and other relevant client device parameters. The gateway then records this information to an address mapping table of the gateway.

An embodiment of the invention includes a IP address that is consistent with a local subnet being dynamically obtained through DHCP. Another embodiment includes a default gateway IP address that is consistent with a local subnet being dynamically obtained through DHCP.

Notes on Addressing

All client devices on the network have IP addresses that are obtained through one of two different methods. A first method includes the IP address being dynamically assigned to the client device by a DHCP Server. A second method includes the IP address being statically assigned to the client device.

For each of the methods, the IP address of the client device may not match the subnet mask of the downlink interface(s) of the access nodes on the network. This inconsistency is resolved through the maintenance of host-specific routes to client devices, rather than subnet routes.

The use of subnet routes to route to client devices or other hosts is usual in a static networking environment. The rationale for using subnet routes is that a single route table entry for a subnet can address all hosts on the corresponding subnet. Therefore, the number of route table entries is kept to a minimum.

However, in a network where the client devices frequently change their point of attachment to the network, the IP addresses of a client device must change to reflect the subnet mask of the new point of attachment. This requires a new DHCP transaction. Additionally, this leads to disruption and resets of network sessions. In the context of Mobile IP, this problem is resolved by maintaining a set of two addresses: one that is dynamically obtained through DHCP and therefore, consistent with the local subnet; and another that remains fixed even as the client device roams. The fixed IP address is used as the termination point for all user sessions and the dynamic address is used to set up a tunnel to the Home Agent.

By using host-specific routes rather than subnet routes to route to the client devices, the problem of the consistency of the client IP address relative to the local subnet address scope, can be avoided.

An embodiment includes the IP address of the client remaining fixed as the client roams. Another embodiment includes the default gateway IP address remaining fixed as the client roams. Another embodiment includes both the first IP address and the default gateway IP address remaining fixed as the client roams within a cluster, between clusters having a common subnet, and between clusters having different subnets.

Communications Path

Generally, several routes need to be set up within the network in order for the client device to communicate with other network entities. First of all, the client device needs to have a default gateway route. Additionally, each of the network elements through which traffic passes to the client device needs to have a route (either direct or indirect) to the client device. This assumes that Network Address Translation is not being performed within the network path under consideration. If NAT is being performed, each device intermediate between the client device and the device doing the NAT needs to have a route (direct or indirect) to the client device The default gateway route on of client device is usually set up either through DHCP assignment, or statically. Therefore, setting up routes to the client device within the access network is a primary issue.

The first steps in setting up routes to the client device includes detecting the MAC address of the client device, and determining the IP address of the client device. This determination of the client device IP address from the device MAC address proceeds through the AARP mechanism as described.

Another step includes the access node of attachment setting up a direct route to the client device on its downlink interface.

Another step includes propagating the direct route through the rest of the access network. The propagation of the route usually takes place through the operation of a routing protocol such as RIP, OSPF, BGP or other. An exemplary embodiment includes reverse beacons being used to propagate information about the direct route upstream from the access node of attachment.

Next, each node on the path to the client device that receives a reverse beacon message containing the IP address of the client device sets up a route in its route table that instructs it how to route packets destined for the client device. For example, a node B, adjacent to access node A, may set up an indirect route to client device C through A (where client device C is directly attached to access node A).

When a reverse beacon containing the client IP address is received by the foreign gateway, the foreign gateway set up a route to the client device.

The foreign gateway sets up a route to the home gateway over a tunnel interface and sends a reverse beacon message to the home gateway over the tunnel. This reverse beacon message contains the IP addresses of the foreign gateway and the client device. Since this reverse beacon message is sent over a tunnel to a remote home gateway, it can be referred to as a "remote reverse beacon".

When the home gateway receives the remote reverse beacon, the home gateway sets up a route to the foreign gateway's IP address, over its tunnel interface. The home gateway also adds an indirect route to the client device IP address through the foreign gateway. Any pre-existing routes for the client device IP address at the home gateway are deleted or updated. This process ensures that when packets for the client device IP address are received at the home gateway, they are routed over the tunnel to the foreign gateway.

Therefore, the remote reverse beacon aids in the upstream propagation of route information for the client devices. Remote reverse beacons may also be used for upstream propagation of route information for access node with an IP address in the home subnet that belongs to the foreign cluster. This ensures that management traffic directed at or from such access nodes are correctly routable.

Additionally, the foreign gateway adds a source route for the IP address of the client device pointing to the home gateway. When packets from the client device are received at the foreign gateway, the source IP address is inspected and found to match the source route entry. Therefore, the packets are forwarded to the home gateway over the IP-in-IP tunnel. This operation is required because edge routers (beyond the foreign gateway) typically implement anti-spoofing and reject or drop packets whose source IP address does not correspond to an address in the local subnet. The source route implementation results in packets from the client being tunneled from the foreign gateway back to the home gateway over an IP-in-IP tunnel.

Figure 7:
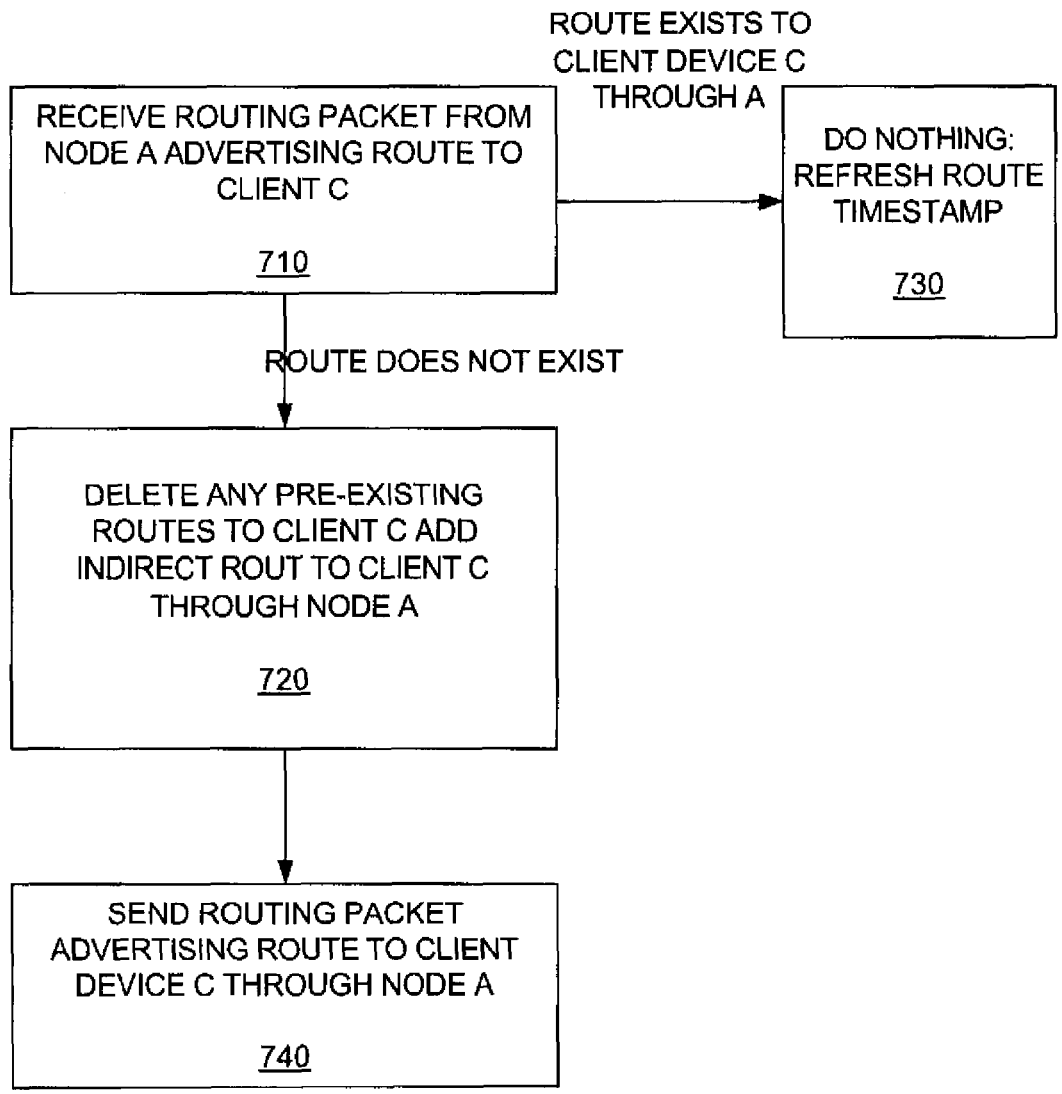
FIG. 7 shows a route addition on an access node when a client is not attached to the access node according to an embodiment of the invention.

FIG. 7 shows a route addition on an access node when a client is not attached to the access node according to an embodiment of the invention.

A first event 710 includes receiving a routing packet from a node A advertising a route to a client C. If a route already exists, nothing else is required. If a route does not exist, then a second event 720 is executed that includes deleting any pre-existing routes to client C, and adding an indirect route to client C through node A. If a route does exist, then a third event 730 includes doing nothing but refreshing a route timestamp. A fourth event 740 includes sending a routing packet advertising a route to client C through node A.

Figure 8:
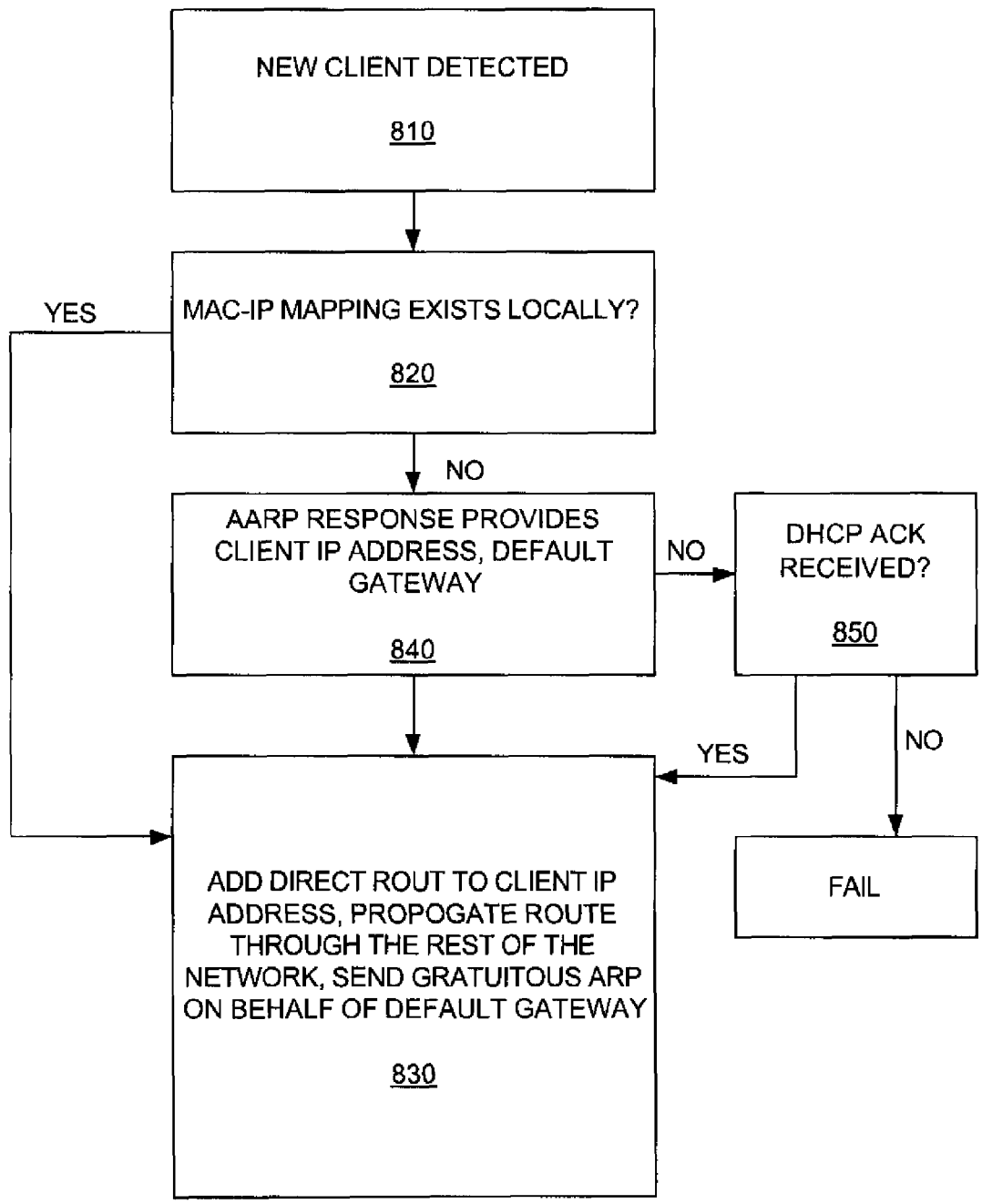
FIG. 8 shows a route addition on an access node when a client is not attached to the access node according to an embodiment of the invention.

FIG. 8 shows a route addition on an access node when a client is attached to the access node according to an embodiment of the invention.

A first event 810 includes detecting a new client MAC address.

A second event 820 includes determining whether the MAC-IP mapping exists locally.

A third event 830 is executed if the MAC-IP mapping does exist locally, and includes adding a direct route to the client IP address, propagating the route through the rest of the network, and gratuitously sending an ARP on behalf of the gateway.

A fourth event 840 is executed if the MAC-IP mapping does not exist locally, and includes sending an AARP request to an AARP server.

A fifth event 850 includes waiting for an AARP response providing a client IP address and a default gateway. If an AARP response is received, then the third event 830 is executed by adding a direct route to the client IP address, propagating the route through the rest of the network, and gratuitously sending an ARP on behalf of the gateway. If a AARP response is not received, then a sixth event include analyzing a DHCP acknowledgement if received. If the acknowledgment is received, then the third event 830 is executed.

An embodiment of the invention includes aiding in a routing of information through the communication path between the client. The aiding can include updating a routing table for each of the access nodes and gateways that exist in the communication path between the first access node and the destination. Additionally, routing tables of other network elements on the backbone network may be updated.

Route-setup at the Interface Between the Access Network and the Backbone Network In order for the client device to be reachable from the backbone network, routes to the client device need to exist on the backbone network. An edge router can be utilized between the access network and the backbone network to allow the client to be reached by the backbone network. This connection between the client and the backbone can be advertised or propagated within the backbone network through standard mechanisms such as route advertisements using standard protocols such as BGP.

Typically, there will be a subnet route on the edge router on the port to which the segment of the Access Network is attached. All IP addresses within this subnet will be assumed (by the Edge Router) to be directly reachable. However a client device with an IP address on this subnet may actually only be reachable through multiple hops, at least one of which traverses a gateway. Therefore the gateway shall "proxy ARP" over its uplink Interface on behalf of all IP addresses to which it has a route on its downlink interface(s). In this way, no special routing needs to occur in order for the client device to be reachable from the backbone network.

When a client device switches from one cluster to another while remaining on the same subnet (i.e., switches between clusters whose gateways are attached to the same subnet), the gateway to the cluster that it has just joined sends one or more "gratuitous ARPs" on behalf of this client device, and starts proxy ARPing on behalf of this client device since it now has a route to the client device on one of its downlink interfaces. The gateway of the cluster from which the client device roamed stops proxy ARPing on behalf of this client device since its route to the client device on its downlink interface has now disappeared.

When a client device switches between clusters that are not on the same subnet, the gateway of the cluster to which it used to belong continues to proxy ARP on its behalf because the route to the client device on its Downlink Interface has now been replaced by a route to the client device over its tunnel interface (which is treated as another Downlink Interface).

An embodiment includes wherein the gateway can providing a proxy ARP so that a device outside of the wireless system can be spoofed into sending frames addressed to the client IP address to the first gateways MAC address.

An embodiment includes a second gateway providing an ARP to an edge router upon the client switching from a first cluster to a second cluster so that an ARP cache within the edge router can be updated.

Maintaining Fixed Client Network Parameters as the Client Roams

Embodiments of the invention include at least some client network parameters remaining fixed as the client device roams. An embodiment includes an IP address being statically assigned. An embodiment includes the client IP address remaining fixed as the client roams. An embodiment includes a default gateway IP address remaining consistent with a local subnet being dynamically obtained through DHCP. An embodiment includes a default gateway IP address that is consistent with a local subnet being dynamically obtained through DHCP. An embodiment includes the default gateway IP address remains fixed as the client roams. An embodiment includes both the first IP address and the default gateway IP address remaining fixed as the client roams within a cluster, between clusters having a common subnet, between clusters having different subnets.

Addressing Application Support Requirements

Certain commonly-used applications impose specific requirements that can invalidate a roaming/handoff configuration. This is because some applications are dependent on the values of certain networking parameters associated to client devices. These applications can reset, fail or timeout in response to changes in these parameters. Therefore, it is important to ensure that these critical parameters do not change as the client device roams through the network.

A simple example is an IP address of a client device. If the IP address of the client device changes, any TCP or UDP sessions in progress are lost and have to be restarted. All associated data can potentially be lost and the application may have to be manually restarted. This can adversely affect an end-user experience. This problem is solved through Mobile IP, which maintains a constant Home Address while adapting the Care-Of Address to the local subnet in which the client device currently is.

Other client device parameters changes that may affect application session-persistence include a client device's default gateway's IP address, and Client Device's Access Node's MAC address.

Some applications (such as VPNs, SSH, SSL) use the client device's default gateway's IP address and/or MAC address as seeds to generate the application encryption keys. If these addresses change, the application resets, resulting in loss of the session.

Figure 9:
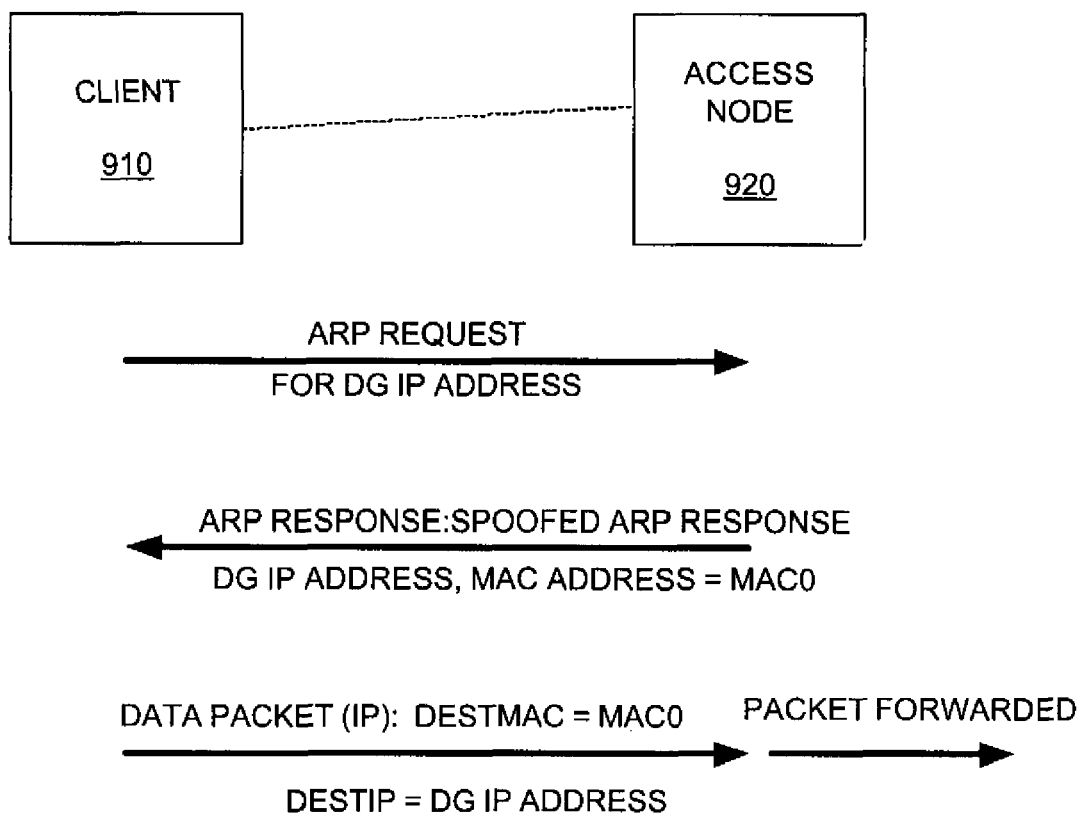
FIG. 9 shows a sequence of events of a spoofed ARP according to an embodiment of the invention.

FIG. 9 shows a method of a spoofed ARP. The method includes interactions between a client device 910 and an access node 920.

A valid MAC address that is a fixed address throughout the access network can be designated as a "Common MAC Address". This address generally should not be the MAC address of any real device within the access network. When a client device 910 sends an ARP request to resolve the MAC address of a host on its subnet or the MAC address of its default gateway, the access node 920 responds with an ARP response indicating that the requested IP address has a MAC address which is the same as the common MAC Address (we will refer to this as a Spoofed ARP Response). In this way, all frames from a client device to a host within its subnet are addressed (at the MAC Layer) to the Common MAC Address. The access nodes are programmed to accept any frames addressed (at the MAC Layer) to the Common MAC Address and treat them exactly as if they were frames addressed to the MAC address of the Downlink Interface on which they were received. This procedure ensures that the ARP cache entries on the Client Device never change while it is within the Access Network even as it roams from one Access Node to another. This allows for the maintenance of application sessions as the client device roams within the access network, since the application may be sensitive to the MAC address of the point of attachment.

When a client device first attaches itself to an access node, the access node can detect the client device and determine its MAC address, IP address and its default gateway's IP address, as previously described. The access node can then generate one (or more than one, to guard against packet losses) Spoofed ARP responses advising the client device that its default gateway's MAC address is the same as the Common MAC address.

Descriptions of Particular Roaming Situations

New Client

Generally, when a client device appears onto the access network for the first time, it issues a DHCP discover upon boot-up. The DHCP transaction, conducted with a DHCP server, involves a four-way handshake comprising a DHCP discover, a DHCP offer, a DHCP request and a DHCP ACK. Each of these DHCP transactions occur through mediation of a DHCP relay co-located with the access node. The access node intercepts the DHCP ACK packet and determines the client device's IP address and its default gateway's IP address.

An embodiment includes the determined addresses being used to populate an AARP update that is sent to the access node's gateway. The gateway can record the client device's MAC and IP addresses and its default gateway's IP address in addition to a timestamp in its address mapping table.

The access node then adds a direct route to the client cevice on its Downlink Interface, propagates this route throughout the access network, and gratuitously ARPs on behalf of the default gateway IP address.

Client Device Roaming within a Cluster

When the client device roams to another access node served by the same gateway, the new access node detects the client device's MAC address using one of the mechanisms previously described. The new access node then sends an AARP Request to the gateway for the client cevice's other parameters. The gateway references its address mapping table and replies with an AARP response containing the client device's IP address, its default gateway's IP address and other relevant parameters.

The new access node records the information from the AARP Response, adds a direct route to the client device on its Downlink Interface, propagates the new route throughout the access network and starts gratuitously ARP'ing on behalf of the client device's default gateway's IP address. The new route propagates through the network and the old direct route from the old access node to the client device is deleted and all existing routes within the access network to the client device are reset.

Any traffic en route to the client device while it is roaming between access nodes is rerouted to the new access node based on the changes to the route tables throughout the access network.

Client Device Roaming Between Cluster

When a client device roams to an access node that is served by a different gateway, the new access node sends an AARP Request to its gateway requesting the client device's network parameters. The gateway references its address mapping table, and finds no corresponding entry, and sends an AARP Request to the other gateways. The gateway serving the previous access node to which the client device was previously attached responds to this AARP Request with the client device's parameters. The new gateway can send an AARP response to the new access node which then adds a direct route to the client device, propagates the new direct route throughout the access network and starts gratuitously ARP'ing on behalf of the client cevice's default gateway's IP address.

Any traffic en route to the client device while it is roaming between clusters is routed to the gateway of the original cluster. Since the access node now belongs to a new cluster, this traffic is rerouted to the new cluster. Since different clusters may be on different segments or subnets that are not directly connected, this traffic must pass through an IP-in-IP tunnel between the gateways of the two clusters. Upon emergence from the tunnel, the traffic is routed as usual to the access node to which the client device is attached, and therefore, to the client device itself.

As will be described, IP-in-IP tunnels between gateways can be set up, maintained and torn down.

Messaging Between Clusters

Different clusters can be located on different subnets, or physically separated network segments. When traffic for a client device is received at a gateway which does not service the access node to which the client device is currently attached, the traffic needs to be rerouted to the gateway of the appropriate cluster. Since the clusters may be on different subnets, this rerouting must occur through an IP-in-IP encapsulated tunnel.

A Network Management System (NMS) can maintain a list of all gateways in the access network system and can inform each gateway about the IP addresses of all other gateways in other subnets. Gateways can then communicate with each other and create IP-in-IP tunnels to each other. When data traffic for the client device is received at the old gateway, it can be encapsulated within another IP datagram with destination IP address the same as the other gateway (the gateway of the cluster to which the client device is currently attached) and routed through the tunnel. At the other end of the tunnel, the new gateway decapsulates the datagram by stripping off the outer IP header and routes the (decapsulated) packet based on its destination IP address (which is the IP address of the client device).

If a tunnel is inactive for a long period of time, the NMS can instruct the tunnel end-points to tear down the tunnel in order to reduce the tunnel maintenance overhead. In this way, tunnel creation, maintenance and termination can be centrally controlled by an NMS. Tunnel creation, maintenance and termination can also be handled through distributed and autonomous decisions made by the gateways on each subnet.

In addition, each gateway can be informed of the IP addresses of all other gateways by the NMS. When a gateway needs to send an AARP Request to the other gateways, it sends unicast datagrams to all the other gateways of which it has been notified by the NMS. In the case where all the gateways are on the same network segment, the network overhead incurred by these serial unicasts may be reduced by sending a single AARP request to the broadcast IP address instead. AARP replies, however, are always unicast to the requestor.

An Example of Roaming Between Clusters: Roaming Between Gateways

A gateway can also be an access node. Therefore, client devices can attach directly to a gateway. A client device C that is directly attached to gateway A can roam into a neighboring cluster and attach directly to another gateway B.

When a client device C is detected at gateway B, a local AARP Client Process on Gateway 13 sends an AARP Request to the AARP Server Process (on Gateway B). The AARP Server Process then sends off an AARP Request to the other Gateways in the Access Network. Gateway A, to which Client Device C was last attached, responds with an AARP Response to the AARP Server process on Gateway B. The AARP Server process on Gateway B then sends an AARP Response to the local AARP Client Process with the client's parameters. A route is then added to C at Gateway B, which then sens off an AARP Update packet to all other Gateways on the Access Network. Gateway A, receiving this AARP Update, deletes its direct route to Client Device C and replaces it with a route to C over the inter-Cluster tunnel to Gateway B. Packets that are subsequently received at Gateway A for Device C are routed over the tunnel to Gateway B and thence to Device C.

An embodiment includes an IP-in-IP tunnel being created between a first gateway of the first cluster and a second gateway of the second cluster. An embodiment includes the first cluster being connected to a first subnet, and the second cluster being connected to a second subnet, and information destined for the client through the first gateway being rerouted to the second gateway through an IP-in-IP encapsulated tunnel.

An embodiment includes the first gateway and the second gateway being maintained by a network management system. The network management system can control creation, maintenance, and removal, of an IP-in-IP tunnel formed between the first gateway and the second gateway.

An embodiment includes data traffic for the client being received by the first gateway, encapsulated within an IP datagram having a same destination IP address as the second gateway, and being routed through the tunnel. An embodiment includes the second gateway decapsulating the IP datagram by stripping an IP header, and routing the data traffic based upon an IP destination address.

Dead Gateways

Situations can arise in which gateways become un-operable. These gateways can be classified as "dead". Obviously, a gateway dying effects routing between client devices and upstream networks.

To minimize the effects of a dying gateway, each gateway of the network can maintain a list of all other gateways on all subnets of the network. The list includes an IP address of the gateway, a gateway status, and at least one subnet associated with the gateway. If any gateways within the network are determined to be dead, all tunnel routes through the dead gateways are torn down, and new tunnel routes are established for roaming clients through live gateways that serves a same subnet as dead gateways. Each gateway can send empty remote reverse beacon routing packets. A gateway receiving an remote reverse beacon routing packets can send an acknowledgment to the empty remote reverse beacon routing packets.

An embodiment includes each gateway periodically sending empty remote reverse beacon routing packets to designated dead gateways within gateway lists. If a remote reverse beacon routing packet acknowledgement is received from designated dead gateways, then a status of the designated dead gateways is updated to a designated live gateway status. Routes to clients can be aged out through reverse beacon routing packet timeout mechanisms. If within a certain timeout interval, a reverse beacon routing packet is not received with the IP address of the client device, then the route can be purged. A reverse beacon timeout value can be greater than an expiry timer for host routes within a cluster.

Client Roaming While Preserving DHCP Address Assignment

Figure 10:
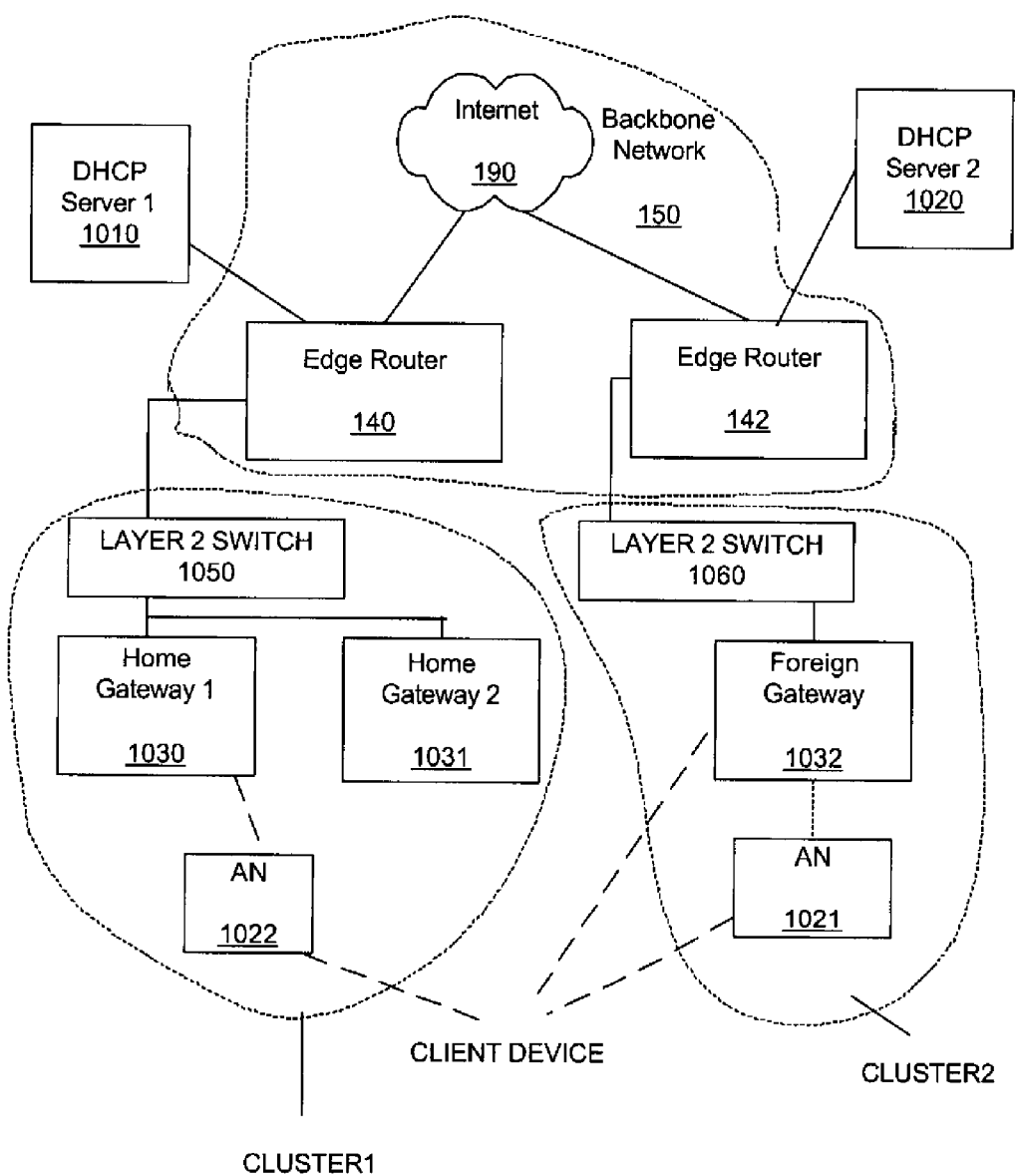
FIG. 10 shows a mesh network in which DHCP packets can be routed between subnets.

FIG. 10 shows a mesh network in which DHCP packets can be routed between subnets. The mesh network includes a first subnet defined by the first edge router 140, and a second subnet defined by the second edge router 142. As shown in FIG. 10, a first DHCP server 1010 is connected to the first edge router 140, and a second DHCP server 1020 is connected to the second edge router 142. The mesh network further includes a first cluster and a second cluster. The first cluster includes a layer 2 switch 1050, a first home gateway 1030, a second home gateway 1031 and an access node 1022. Clearly, additional gateways and access nodes can be included within the first cluster. The second cluster includes a layer 2 switch 1060, a foreign gateway 1032 and an access node 1021. Clearly, additional gateways and access nodes can be included within the first cluster. The client device can roam from the first subnet to the second subnet. For example, the client device can roam from accessing the first subnet through the access node 1022, to accessing the second subnet through either the access nodded 1021, or through the foreign gateway 1032.

After the client device (with an IP address assignment IP1 in the first subnet) roams from to a new node (with IP address N which may be in the first subnet or the second subnet or any other subnet), the client device may issue a DHCP Renew request to renew its IP address assignment. A DHCP relay agent on node N intercepts the DHCP Renew packet, sets the giaddr field in the DHCP packet to its IP address (N) and unicasts the DHCP Renew packet to its current foreign gateway (such as, foreign gateway 1032). The DHCP agent on the foreign gateway receives this packet and looks up the client devices home gateway based on the client device's requested IP address or the client device's current IP address. If the home gateway lookup succeeds, the foreign gateway sets the Remote ID option in the DHCP Renew packet to the IP address of the home gateway and unicasts the packet to the home gateway's IP address. When the home gateway receives the DHCP Renew packet, the home gateway examines the Remote ID field. If the Remote ID field matches an IP address of the home gateway, the home gateway creates a map of the xid field in the DHCP Renew packet to the giaddr field (which is the IP address of node N). The home gateway then changes the giaddr field on the DHCP Renew packet to home gateways's IP address, and unicasts the packet to the home DHCP server (for example, the DHCP server 1010.

The home DHCP server receives the DHCP Renew request and issues a DHCP Ack packet, thereby extending the offered lease to the client device. This DHCP Ack packet is unicast by the home DHCP server to the home gateways's IP address and contains an xid identifier that is identical to that in the DHCP Request packet. When this packet is received by the home gateway, the home gateway uses the xid-to-giaddr mapping to retrieve the IP address of node N. The home gateway then sets the giaddr field in the DHCP Ack to be the node N's IP address and unicasts this modified packet to node N. Node N receives the DHCP Ack and relays it to client device. Upon receiving the DHCP Ack, the client device resets its lease timeout value and resumes sending data.

If the client device is directly attached to the foreign gateway, the client device may send a DHCP Renew packet to its foreign gateway (that is, the foreign gateway the client device is connect to). The DHCP agent on the foreign gateway receives this packet and looks up the client device's home gateway based on the client device's requested IP address or its current IP address. If the home gateway lookup succeeds, the foreign gateway sets the Remote ID option in the DHCP Renew packet to the IP address of the home gateway, the giaddr field to its foreign gateway's IP address and unicasts the packet to the home gateway's IP address. When the home gateway receives the DHCP Renew packet, the home gateway examines the Remote ID field. If the Remote ID field matches an IP address of the home gateway, the home gateway creates a map of the xid field in the DHCP Renew packet to the giaddr field (which is the IP address of node N). The home gateway changes the giaddr field on the DHCP Renew packet to the home gateway's IP address and unicasts the packet to the home DHCP server.

The home DHCP server receives the DHCP Renew request and issues a DHCP Ack packet, thereby extending the offered lease to the client device. This DHCP Ack packet is unicast by the home DHCP server to the home gateway's IP address and contains an xid identifier that is identical to that in the DHCP Request packet. When this packet is received by the home gateway, the home gateway uses the xid-to-giaddr mapping to retrieve the IP address of foreign gateway. The home gateway sets the giaddr field in the DHCP Ack to be the foreign gateway's IP address and unicasts this modified packet to foreign gateway. The foreign gateway receives the DHCP Ack and relays it to client device. Upon receiving the DHCP Ack, the client device resets its lease timeout value and resumes sending data.

The Agent Remote-ID field is a DHCP Relay Agent Information SubOption is defined in RFC (request for comment) 3046. Servers recognizing the Relay Agent Information option may use the information to implement IP address or other parameter assignment policies. The DHCP Server echoes the option back verbatim to the relay agent in server-to-client replies, and the relay agent strips the option before forwarding the reply to the client device.

Figure 11:
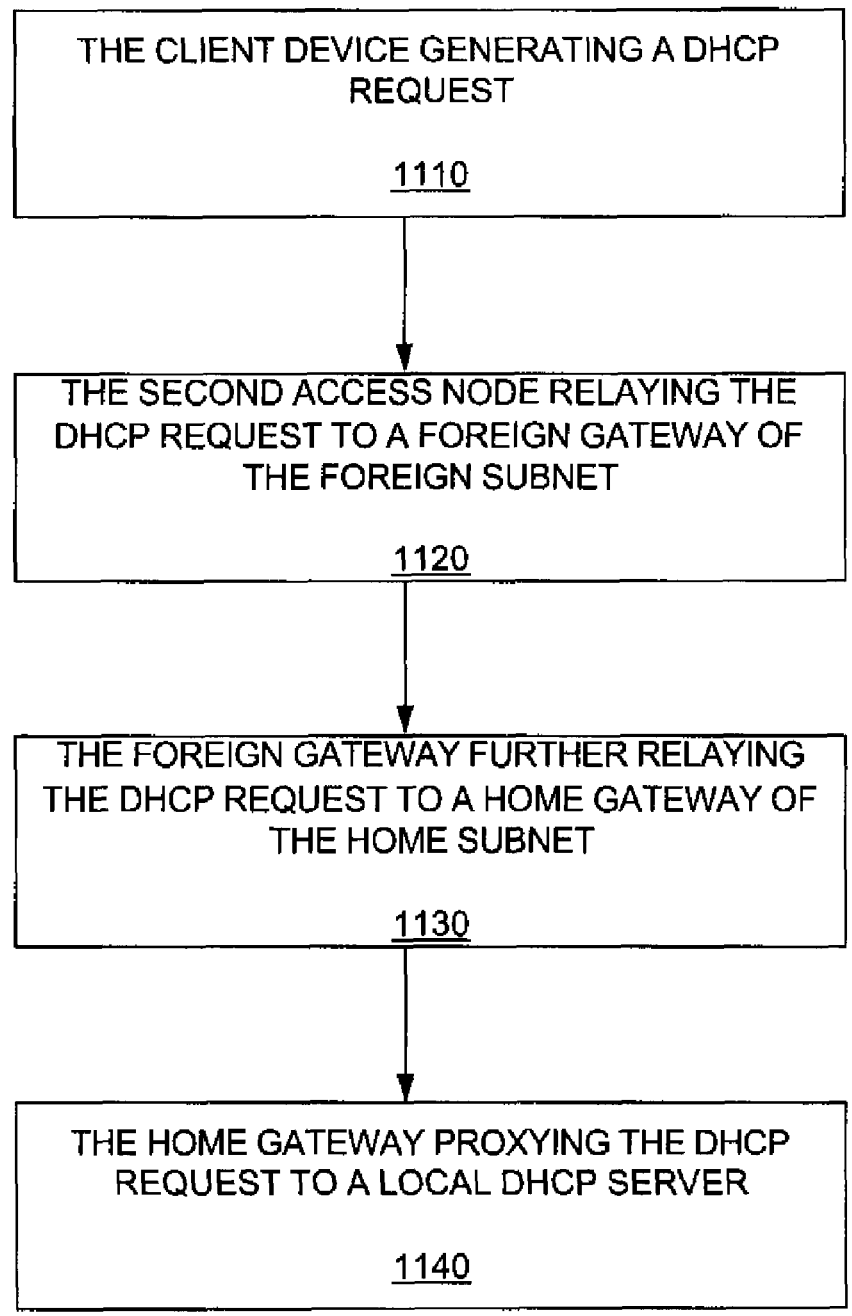
FIG. 11 is a flow chart that includes steps of a method of routing DHCP packets within a mesh network.

FIG. 11 is a flow chart that includes steps of a method of routing DHCP packets within a mesh network. A client device can access the mesh network through at least one of a home subnet and a foreign subnet. A first step 1110 includes the client device generating a DHCP request, a second step 1120 includes the second access node relaying the DHCP request to a foreign gateway of the foreign subnet, a third step 1130 includes the foreign gateway further relaying the DHCP request to a home gateway of the home subnet, and a fourth step 1140 includes the home gateway proxying the DHCP request to a local DHCP server.

Figure 12:
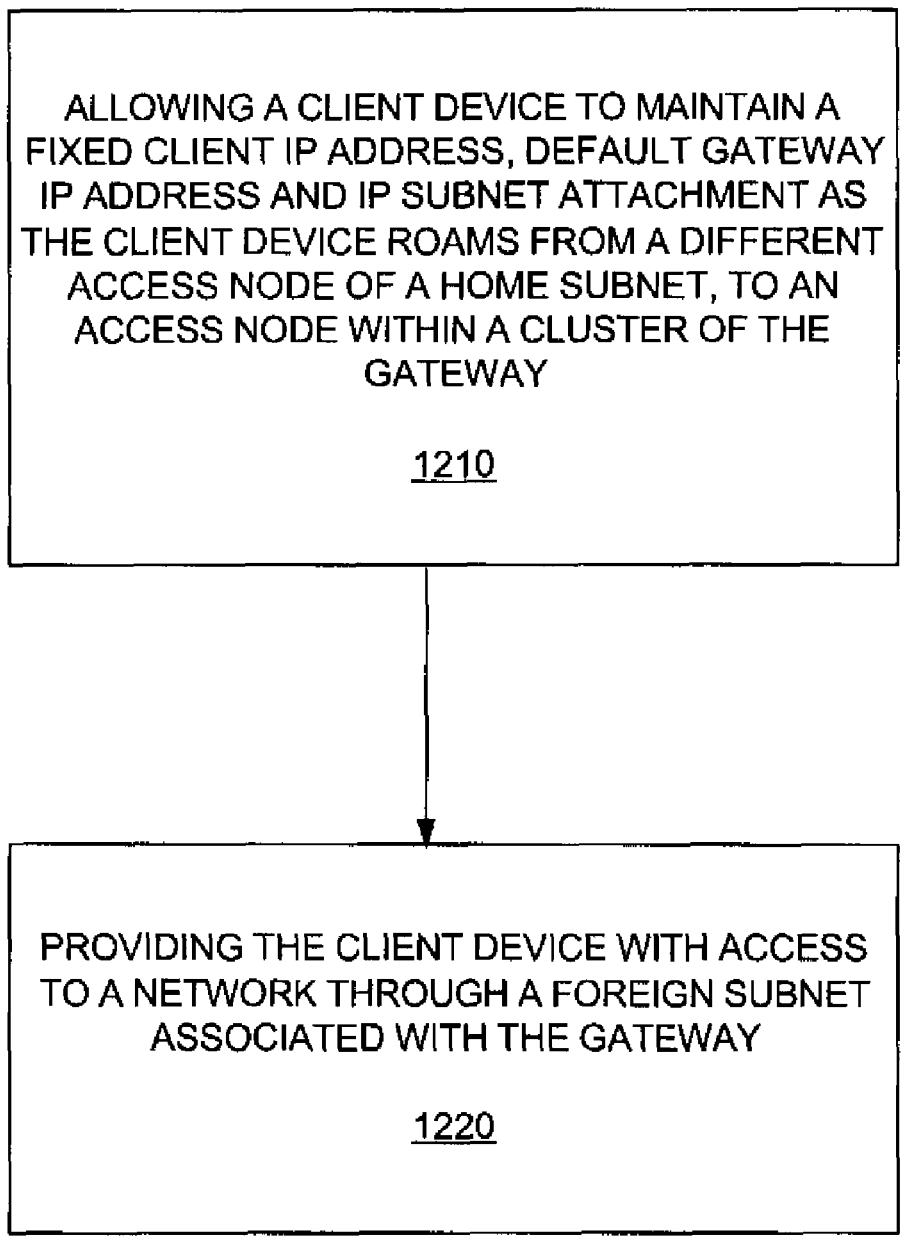
FIG. 12 is another flow chart showing a method of operating a gateway.

FIG. 12 is another flow chart that shows a method of operating a gateway. A first step 1210 includes allowing a client device to maintain a fixed client IP address, default gateway IP address and IP subnet attachment as the client device roams from a different access node of a home subnet, to an access node within a cluster of the gateway, and a second step 1220 includes providing the client device with access to a network through a foreign subnet associated with the gateway.

Figure 13:
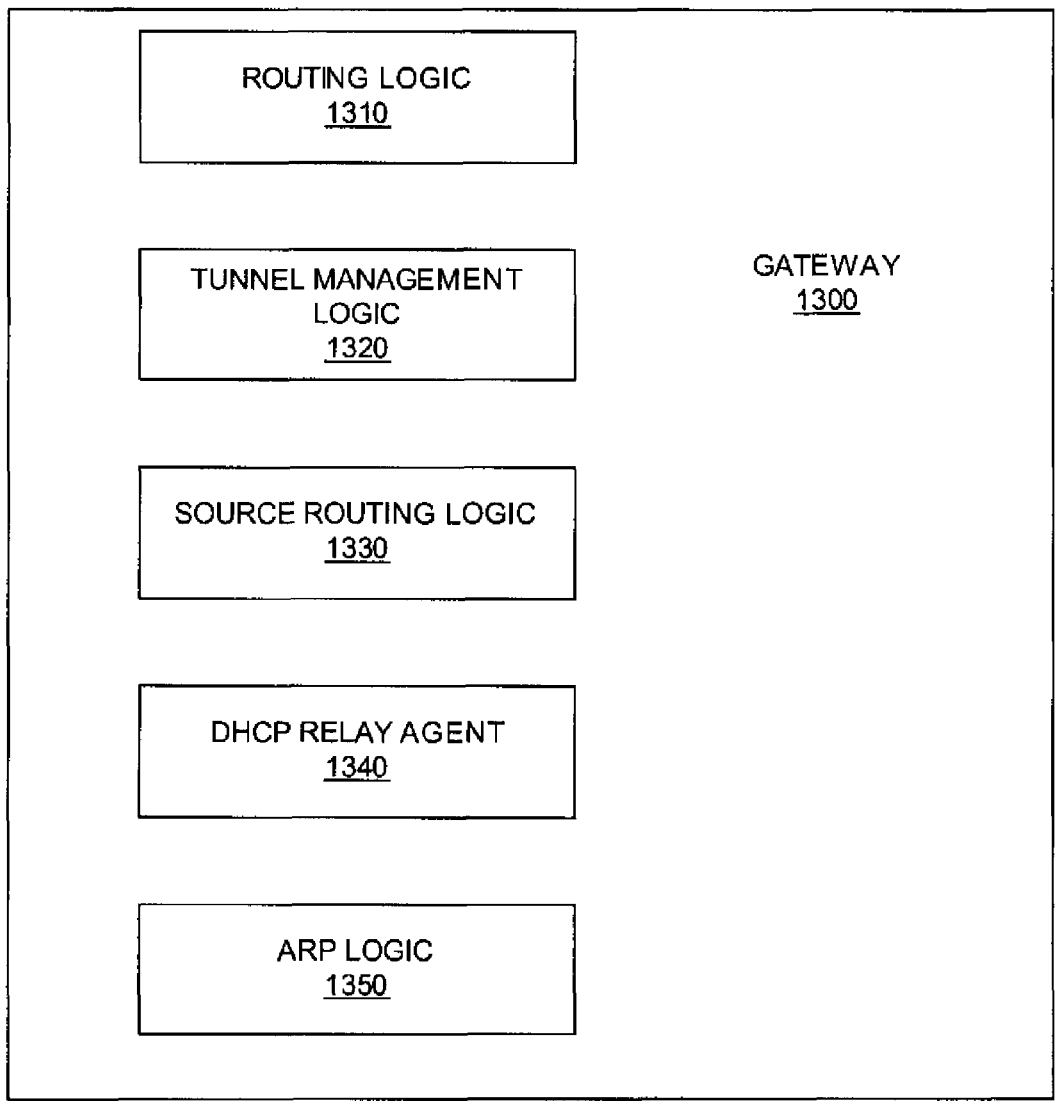
FIG. 13 shows an embodiment of a gateway.

FIG. 13 shows an embodiment of a gateway 1300. The gateway 1300, which can also operate as an access node, generally includes routing logic 1310, tunnel management logic 1320, source routing logic 1330, a DHCP relay agent 1340, and ARP logic 1350, all of which have been described.

Although specific embodiments of the invention have been described and illustrated, the invention is not to be limited to the specific forms or arrangements of parts so described and illustrated. The invention is limited only by the appended claims.

What is claimed:

1. A method of a wireless network allowing a client device to roam from a home subnet to a foreign subnet of the network, comprising:
   a first access node of the home subnet of the network providing the client device wireless access to the network;
   each gateway of the network maintaining a list of other gateways on a plurality of subnets of the network wherein gateways of different subnets are connected to different edge routers, the list comprising an IP address of each of the other gateways, a gateway status of each of the other gateways, and at least one subnet associated with each of the other gateways;
   a foreign gateway of the foreign subnet forming an IP-in-IP tunnel to a home gateway of the home subnet allowing the client device to roam to a second access node of the foreign subnet, the client device wirelessly accessing the network through the second access node, the client device maintaining a fixed client IP address, default gateway IP address and IP subnet attachment as the client device roams from the first access node to the second access node;
   resolving the fixed client IP address of the client device from a MAC address of the client device, wherein resolving the fixed client IP address comprises:
   the foreign gateway of the foreign subnet sending a request to designated gateways of all other subnets of the network;
   the foreign gateway periodically checking a status of the home gateway, wherein the home gateway is connected to a different edge router than the foreign gateway;
   the home gateway receiving a relayed DHCP request; and
   the home gateway relaying the DHCP request to a local DHCP server.

2. The method of claim 1, further comprising the client device maintaining a MAC address of a default gateway as the client device roams from first access node to the second access node.

3. The method of claim 1, wherein the fixed client IP address of the client device is maintained at a home gateway of the client device.

4. The method of claim 1, wherein when the client device roams to the second access node, the client device performs an authentication and association with the foreign gateway of the foreign subnet.

5. The method of claim 4, wherein the authentication and association is according to an 802.11 protocol.

6. The method of claim 4, further comprising the client device issuing a DHCP renew request if an IP address lease of the client is due to expire.

7. The method of claim 6, further comprising:
   the second access node intercepting the DHCP renew request, and the second access node identifying the home subnet of the client device from a locally stored AARP entry from the client device.

8. The method of claim 7, further comprising:
   the second access node relaying the home subnet to the home gateway of the home subnet.

9. The method of claim 1, wherein the request is an AARP request.

10. The method of claim 1, further comprising:
    the home gateway of the home subnet of the client device responding to the request with the fixed client IP address of the client device.

11. The method of claim 10, further comprising:
    the home gateway of the home subnet of the client device responding to the request with the default gateway IP address and IP subnet attachment.

12. The method of claim 1, further comprising:
    each access node along a path from the client device to the foreign gateway setting up a route to the client device through the network.

13. The method of claim 1, further comprising:
    the foreign gateway setting up routes to the client device through the network.

14. The method of claim 1, further comprising:
    the home gateway relaying a DHCP response to an access node the client device is attached, renewing the client device IP address.

15. A wireless network that allows a client device to roam from a home subnet to a foreign subnet of the network, the network comprising a plurality of gateways and a plurality of access nodes, comprising:
    a first access node of the home subnet of the network providing the client device wireless access to the network;
    each gateway of the network maintaining a list of other gateways on a plurality of subnets of the network wherein gateways of different subnets are connected to different edge routers, the list comprising an IP address of each of the other gateways, a gateway status of each of the other gateways, and at least one subnet associated with each of the other gateways;

a foreign gateway of the foreign subnet forming an IP-in-IP tunnel to a home gateway of the home subnet allowing the client device to roam to a second access node of the foreign subnet, the client device wirelessly accessing the network through the second access node, the client device maintaining a fixed client IP address, default gateway IP address and IP subnet attachment as the client device roams from the first access node to the second access node;

the foreign gateway resolving the fixed client IP address of the client device from a MAC address of the client device, wherein resolving the fixed client IP address comprises: the foreign gateway of the foreign subnet sending a request to designated gateways of all other subnets of the network; the foreign gateway periodically checking a status of the home gateway, wherein the home gateway is connected to a different edge router than the foreign gateway;

the home gateway receiving a relayed DHCP request; and the home gateway relaying the DHCP request to a local DHCP server.

* * * * *